United States Patent
De Foy et al.

(10) Patent No.: US 11,985,062 B2
(45) Date of Patent: May 14, 2024

(54) METHODS AND APPARATUSES FOR ENABLING MULTI-HOST MULTIPATH SECURE TRANSPORT WITH QUIC

(71) Applicant: INTERDIGITAL PATENT HOLDINGS, INC., Wilmington, DE (US)

(72) Inventors: Xavier De Foy, Kirkland (CA); Shamim Rahman, Cote St. Luc (CA); Chonggang Wang, Princeton, NJ (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/798,925

(22) PCT Filed: Feb. 16, 2021

(86) PCT No.: PCT/US2021/018185
§ 371 (c)(1),
(2) Date: Aug. 11, 2022

(87) PCT Pub. No.: WO2021/163684
PCT Pub. Date: Aug. 19, 2021

(65) Prior Publication Data
US 2023/0074838 A1    Mar. 9, 2023

Related U.S. Application Data

(60) Provisional application No. 62/976,753, filed on Feb. 14, 2020.

(51) Int. Cl.
*H04L 69/164* (2022.01)
*H04L 9/40* (2022.01)
(Continued)

(52) U.S. Cl.
CPC ............ *H04L 45/566* (2013.01); *H04L 45/24* (2013.01); *H04L 63/0428* (2013.01); *H04L 67/56* (2022.05); *H04L 69/164* (2013.01)

(58) Field of Classification Search
CPC ... H04L 45/566; H04L 45/24; H04L 63/0428; H04L 67/56; H04L 69/164; H04L 69/169; H04W 4/50; H04W 76/15
See application file for complete search history.

(56) References Cited

U.S. PATENT DOCUMENTS

| | | | |
|---|---|---|---|
| 2020/0120015 A1* | 4/2020 | Boucadair | H04N 21/64707 |
| 2020/0145324 A1* | 5/2020 | Wei | H04L 65/40 |
| 2022/0311746 A1* | 9/2022 | Boucadair | H04L 63/0884 |

OTHER PUBLICATIONS

Bonaventure et al., "0-RTT TCP Convert Protocol," TCPM Working Group, Internet-Draft (Nov. 4, 2019).
(Continued)

*Primary Examiner* — Abdulkader M Alriyashi
(74) *Attorney, Agent, or Firm* — Volpe Koenig

(57) ABSTRACT

Methods and apparatuses for enabling multi-host multipath secure transport with Quick User Datagram Protocol (UDP) Connections (QUIC) are described herein. A method performed by a client endpoint may involve sending, to a network node, a request to establish a QUIC connection with a destination endpoint, the request to establish the QUIC connection including a flow identifier (ID). The method may involve receiving, from the network node, a response including an indication that the request to establish the QUIC connection with the destination endpoint is accepted. The method may involve encapsulating inner QUIC packetized data within outer QUIC packetized data, the inner QUIC packetized data including the flow ID. The method may involve sending, to the network node, the outer QUIC packetized data for forwarding toward the destination endpoint based on the flow ID.

20 Claims, 18 Drawing Sheets

(51) Int. Cl.
  *H04L 45/00* (2022.01)
  *H04L 45/24* (2022.01)
  *H04L 67/56* (2022.01)

(56) References Cited

OTHER PUBLICATIONS

Clarembeau et al., "New Applications Above QUIC," Dissertation, Universite Catholique de Louvain (2018).
De Coninck et al., "Multipath Extensions for QUIC (MP-QUIC)," QUIC Working Group, Internet-Draft (Aug. 29, 2019).
Huitema, "QUIC Multipath Requirements," Network Working Group, Internet-Draft (Jan. 7, 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
Iyengar et al., "QUIC: A UDP-Based Multiplexed and Secure Transport," QUIC, Internet-Draft (Nov. 4, 2019).
Iyengar et al., "QUIC: A UDP-Based Multiplexed and Secure Transport," QUIC, Internet-Draft (Jan. 22, 2020).
Kuehlewind et al., "Use Cases and Requirements for QUIC as a Substrate," Network Working Group, Internet-Draft (Nov. 4, 2019).
Pardue et al., "Hypertext Transfer Protocol (HTTP) over multicast QUIC," Network Working Group, Internet-Draft (Aug. 8, 2019).
Pauly et al., "An Unreliable Datagram Extension to QUIC," Network Working Group, Internet-Draft (Nov. 4, 2019).
Pauly et al., "QUIC-Aware Proxying Using Connect-UDP," Network Working Group, Internet-Draft (Oct. 18, 2020).
Piraux et al, "Tunneling Internet protocols inside QUIC," QUIC Working Group, Internet-Draft (Nov. 4, 2019).
Schinazi, "Using QUIC Datagrams with HTTP/3," Network Working Group, Internet-Draft (Nov. 4, 2019).
Thomson et al., "Using TLS to Secure QUIC," QUIC, Internet-Draft (Nov. 4, 2019).

\* cited by examiner

METHODS AND APPARATUSES FOR ENABLING MULTI-HOST MULTIPATH SECURE TRANSPORT WITH QUIC

CROSS-REFERENCE TO RELATED APPLICATIONS

This application is the U.S. National Stage, under 35 U.S.C. § 371, of International Application No. PCT/US2021/018185 filed Feb. 16, 2021, which claims the benefit of U.S. Provisional Application No. 62/976,753, filed Feb. 14, 2020, the contents of which are incorporated herein by reference.

BACKGROUND

There are several use cases where data exchange may be improved based on the protocol design for data paths. For example, in some use cases there may be a need for deep control over multiple network paths by application and service providers. In some use cases, there may be a desire to maintain connectivity to a relocating edge server. Further, in some use cases, there may be a need to maintain connectivity between intermittent device-to-device peers.

SUMMARY

Methods and apparatuses for enabling multi-host multipath secure transport with Quick User Datagram Protocol (UDP) Connections (QUIC) are described herein. A method performed by a client endpoint may involve sending, to a network node, a request to establish a QUIC connection with a destination endpoint, the request to establish the QUIC connection including a flow identifier (ID). The method may involve receiving, from the network node, a response including an indication that the request to establish the QUIC connection with the destination endpoint is accepted. The method may involve encapsulating inner QUIC packetized data within outer QUIC packetized data, the inner QUIC packetized data including the flow ID. The method may involve sending, to the network node, the outer QUIC packetized data for forwarding toward the destination endpoint based on the flow ID.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 11 is a diagram illustrating a second portion of an example of an indirect connection bootstrapping method with a second alternative replacing a QUIC-over-QUIC connection with a QUIC-over-UDP connection;

DETAILED DESCRIPTION

Figure 1A:
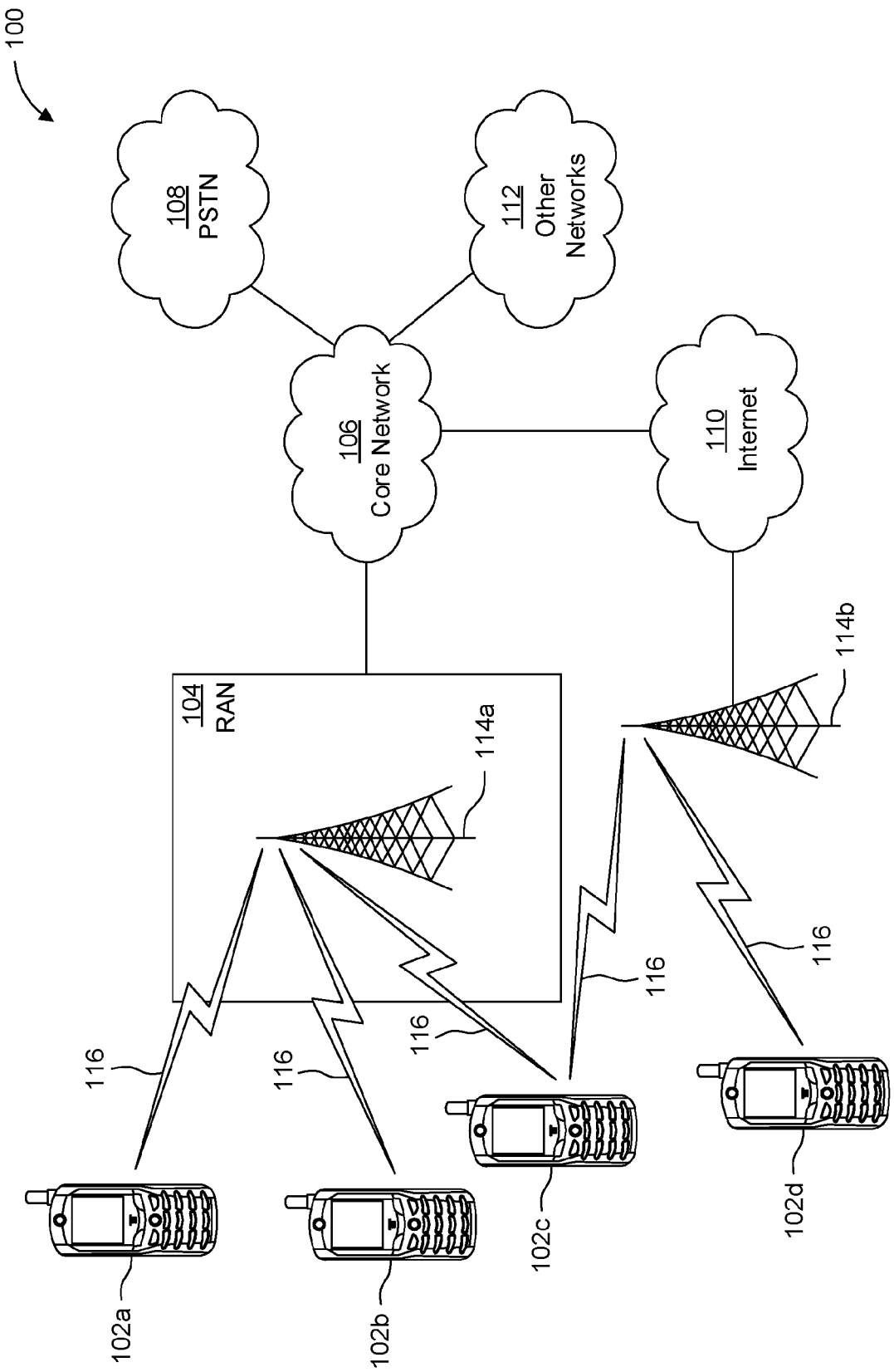
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed, or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple-output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance, using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing an NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
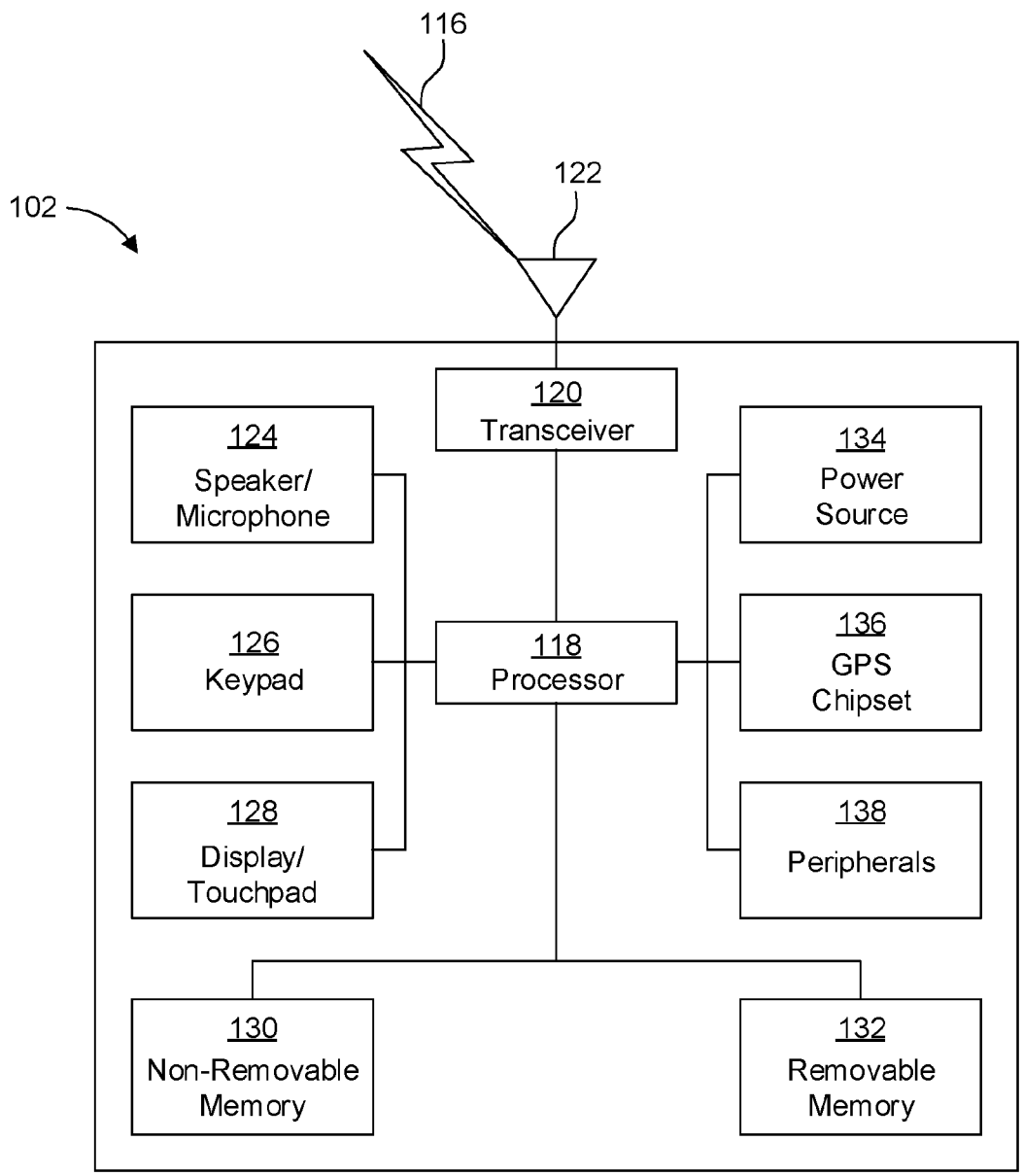
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special-purpose processor, a conventional processor, a digital signal processor (DSP), a plurality of microprocessors, one or more microprocessors in association with a DSP core, a controller, a microcontroller, Application-Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel-metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands-free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full-duplex radio for which transmission and reception of some or all of the signals (e.g., associated with particular subframes for both the UL (e.g., for transmission) and DL (e.g., for reception) may be concurrent and/or simultaneous. The full-duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
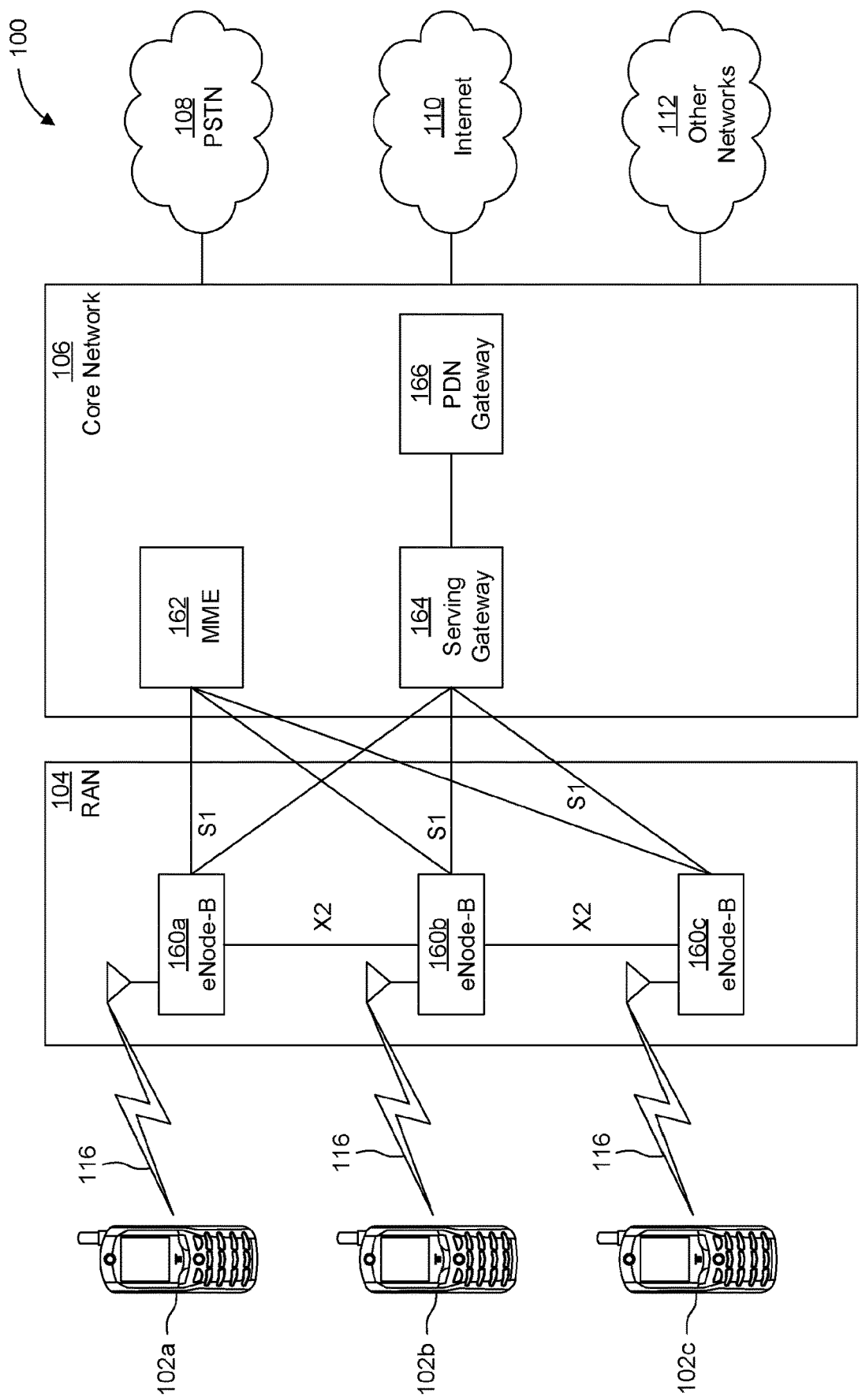
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c, and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c, and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP, and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by an STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to an STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
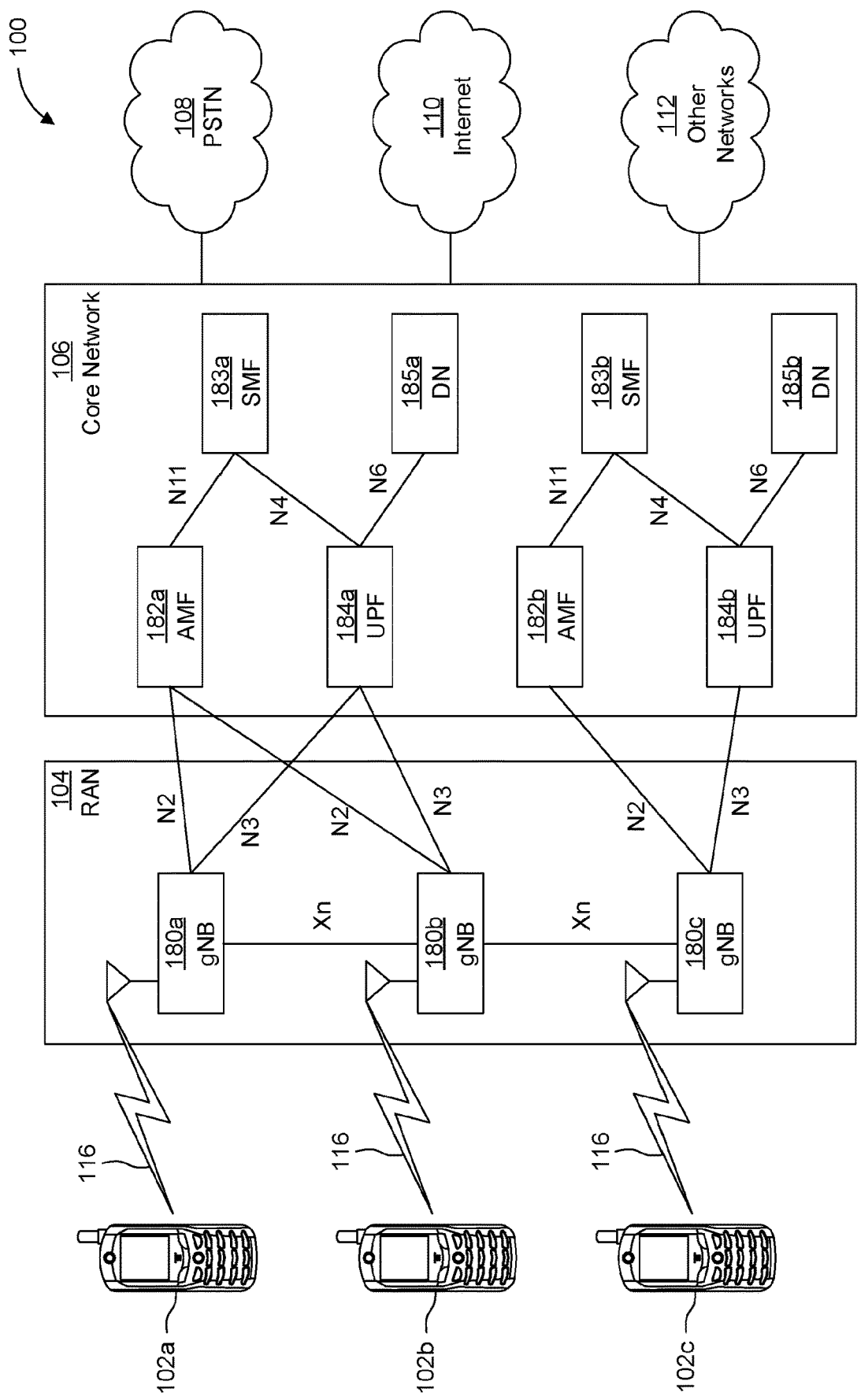
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c, and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b, and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Quick User Datagram Protocol (UDP) Internet Connection (QUIC) is a UDP-based, stream-multiplexing, encrypted transport protocol currently under development. There may be many cases for using QUIC, such as for a substrate, including using proxies, and the like described herein.

Multipath protocols may exist at multiple layers including at a physical layer, link layer, and/or at a transport layer. In particular, transport layer multipath protocols may include Multipath Transmission Control Protocol (TCP) (MPTCP), Stream Control Transmission Protocol (SCTP), and Multipath QUIC (MP-QUIC).

In one or more embodiments described herein, there may be a multi-hop (MH), multipath (MP) mechanism (MHMP) at the transport layer, which may use QUIC and its multipath extensions (MP-QUIC) as base technologies, since it is a secure transport protocol. Hosts involved at both sides of an MHMP transport connection may be designated as endpoints or peers. An endpoint may also be referred to as an end user, a client endpoint, a destination endpoint, a target endpoint, a server, or a server endpoint, a user device, a WTRU, a UE, a terminal, a host, or a host user, and such terms may be used interchangeably throughout. The client endpoint may initiate the connection, while the other endpoint may be the server endpoint. The intermediate nodes in an MHMP connection may be called proxy nodes, network nodes, or forwarding nodes. Such terms may be used interchangeably throughout.

Endpoints, proxies, nodes, and other systems as referenced throughout may be capable of establishing paths, steering the flow of data over such paths via hardware or software. In addition to the components and peripherals described above that may be integrated within or operatively connected to a WTRU, NodeB, or STA, an endpoint, a server, or any node used to implement or a deploy a proxy may include any of the following: a processor; a field programmable gate array (FPGA); an integrated circuit; a memory bank; random access memory (RAM); non-volatile secondary storage; a non-transitory storage medium such as magnetic, optical, or electronic memory; an antenna; an antenna array; a network interface controller; a network interface card; a modem; a hub; a switch; or a router.

A goal of an MHMP transport protocol may be to establish and maintain an end-to-end (e2e) MHMP connection between peers. An e2e MHMP connection may be comprised of one or more individual flows between endpoints, which may be called path connections, and may also be referred to more simply as "paths". Path connections through a proxy may be "indirect paths", while others may be "direct paths". Multipath protocols such as MP-QUIC, MPTCP, and SCTP may have only direct paths between peers, while MHMP protocols may have both direct and indirect paths.

The connection between an endpoint and a proxy may be called a "proxy connection" herein. Two proxies may also be connected to each other, which may be referred to as a proxy connection.

In some legacy cases, traffic steering between endpoints of a multipath transport session may be under the control of network operators, through the deployment and configuration of routing devices and protocols in their networks. In some instances, neither the end-users nor the application providers may have direct control over traffic steering, beyond selecting which local network interfaces (e.g., WiFi or cellular) to use to establish path connections.

In one or more embodiments disclosed herein, there may be a multi-hop, multipath protocol at the transport layer, where the end-users, through the selection of proxies, and application providers, through the deployment of proxies in the network (e.g., as software instances over physical or virtual servers, or as Virtual Network Functions, VNFs), may more directly influence path selection and usage. This approach may enable multiple use cases, as summarized in table 1, which illustrates at least some examples of use cases and motivations for implementing the disclosed embodiments.

TABLE 1

Use Cases and Motivations

| Use Case | Use Case Motivation | Examples of Potential Real-Life Systems and Impacted Nodes |
| --- | --- | --- |
| UC 1: Deep Control over Multiple Network Paths by Application and Service Providers | Enable application providers and/or users to select paths through the network for a multipath connection, e.g. for higher reliability or security from eavesdropping. Path may be selected by requiring it to pass through a particular autonomous system or data center. | Streaming applications (Netflix, Hulu, etc.), social network applications (Facebook, Instagram, etc.). Application clients, servers and proxies are impacted. |
| UC 2: Maintaining Connectivity to a Relocating Edge Server | Enable a transport connection to be maintained, unmodified from the client side, when a server migrates to another server (where both servers use a different IP address). | Edge cloud applications, e.g. for video streaming, real time vehicular applications, etc. Application clients and successive servers are impacted. |
| UC 3: Maintaining Connectivity between Intermittent D2D Peers | Enable device-to-device communication to be established indirectly through a proxy, and to transparently migrate to real D2D when possible. | Privacy-conscious social media applications enabling secure video/chat direct communication between clients, possibly in vehicular context. Clients and proxies are impacted. |
| UC 4: Establishing and Maintaining Secure Multicastor PubSub Connectivity over QUIC | Enable bootstrapping secure multicast, or point-to-multipoint unicast, e.g. for streaming, publish-subscribe messaging. | Internet broadcast systems (for live events). Publish-Subscribe messaging system, e.g. used in IoT applications. Source/destination endpoints and proxies are impacted. |

In some use cases, there may be deep control over multiple network paths by application and service providers. A cloud application provider, such as Netflix, Google, or Facebook, may exert some control over multipath aspects of its clients' connectivity, enabling path diversity deep within the network. For example, such a cloud application provider may instantiate proxy VNFs in a plurality of data centers, access, and transit networks (assuming that such networks provide a VNF hosting services). Clients may initially connect to a cloud application server using an MHMP capable transport protocol. The cloud application server may then enable path diversity by advertising, over the client-server connection, a list of IP addresses and ports associated with proxy VNFs that the client can connect to. Alternatively, the client may also be configured with, or receive from a different channel, a list of IP addresses and ports associated with proxy VNFs the client can use to connect to the service, which would therefore not require this information to be provided over a direct connection. The client may then establish e2e connections with the cloud application server through the provided proxy VNFs. To establish a proxied e2e connection, the client may communicate IP address/port information to the proxy, and additionally, or alternatively, may communicate a target application-layer identity to the proxy (e.g., username, topic of interest, etc.) From this point on, the client may be connected to the server through multiple MHMP connections, for example crossing different internet autonomous systems, which may have been chosen by the application provider based on criteria such as high reliability, security, and the like. The client may continue to use the direct connection to the cloud application server or not, depending on an application provider policy. A major role of the proxies, in this use case, may be to enable application-controlled path diversity. In some cases, such deep control over multiple network paths may not be available to application providers, in a heterogeneous network context.

This deep control may not be meant to replace existing techniques such as lower layer access steering in 3GPP, where traffic flows can be sent over multiple paths between a WTRU and a UPF. Such deep control, however, may complement such techniques by enabling an application layer entity (e.g., application provider, or user) to specify multiple end-to-end paths to send traffic over, where each of these paths may itself make use lower layer multipath techniques.

Figure 2:
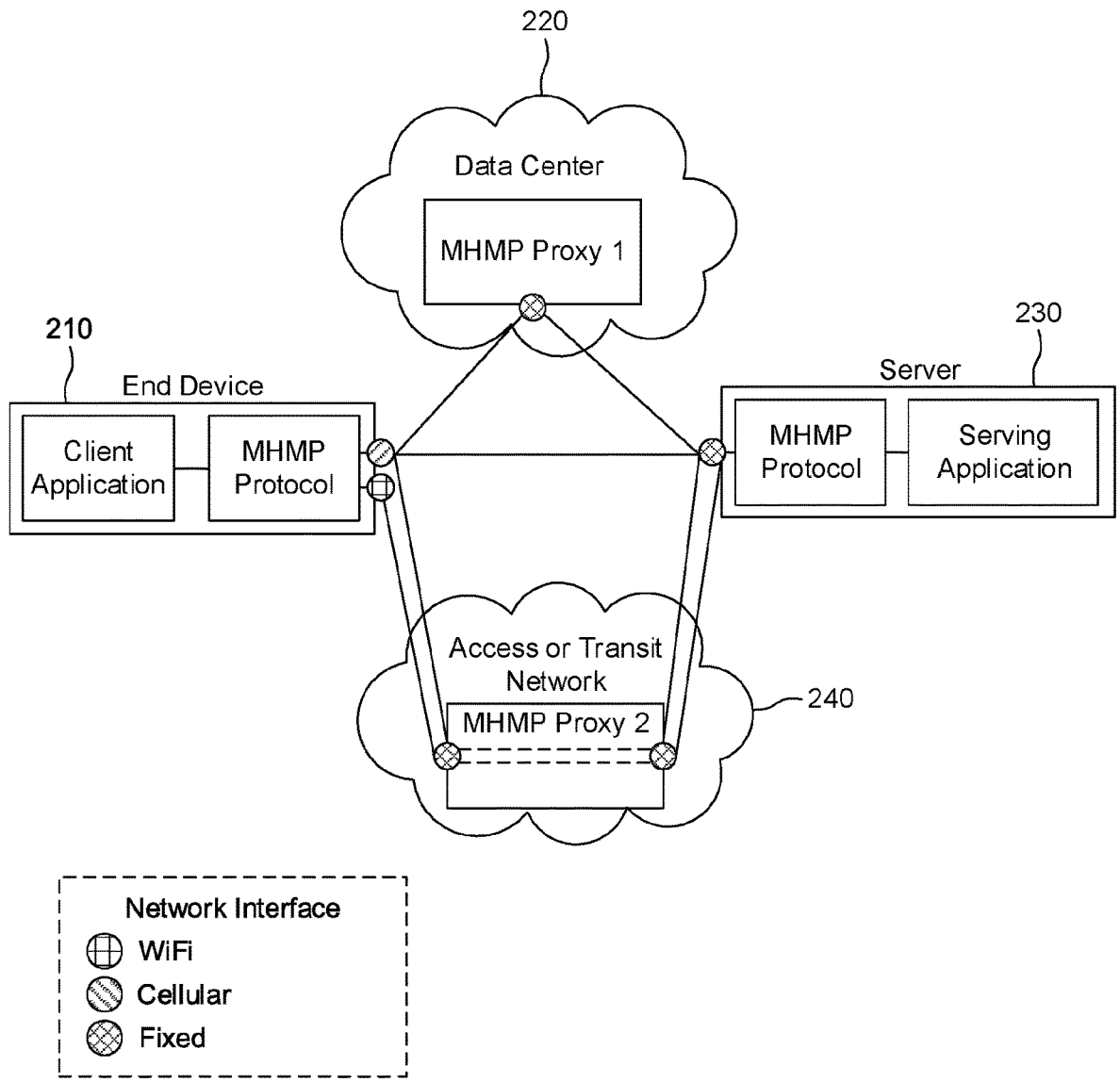
FIG. 2 is a diagram illustrating an example of deep control over multiple network paths by application and service providers.

FIG. 2 is a diagram illustrating deep control over multiple network paths by application and service providers. A network may include an end device or endpoint 210, at which a client application may operate and MHMP protocol functionality is provided. A first MHMP proxy may be provided by a data center 220, and a second MHMP proxy may be provided at an access or transit network 240. A network server 230 may host a serving application and provide MHMP protocol functionality. The end device or endpoint 210 may interface with the first MHMP proxy via data center 220 and the second MHMP proxy via access or transit network 240. The first and/or the second MHMP proxy may interface with the network server 230, via the data center 220 and/or the access or transit network 240. Such interfaces may be possible through WiFi, cellular, or any other wireless or fixed network. There may be three indirect paths and one direct path. Each of these four paths may be established, and encrypted, end-to-end between the end device and the server. In alternative use cases, additional proxies may be chained to, for example, MHMP Proxy 1 at data center 220, to direct traffic over a more complex path through multiple data centers, access or transit networks.

Some use cases may involve maintaining connectivity to a relocating edge server. In the context of a home or enterprise network, or in a smart city scenario, in a 5G or non-5G network (e.g., WiFi or industrial wireless network), a first edge server connected to an endpoint may be migrated to a second edge server, for example, to maintain low latency with a moving endpoint, or for load balancing. This assumes a new application instance is present, or created/migrated, on the second edge server, using a second IP address, different from the first server IP address, for connectivity. Any state transfer between the first and the second edge server, if any, may be performed using an appropriate method, such as application-layer communication either directly or through the client. Assuming a multi-hop multipath transport protocol was originally used between the endpoint and the first edge server, the first edge server may communicate the second edge server IP address, and port, to the endpoint over the initial connection. The endpoint may then initiate connections to the second edge server through the first edge server (e.g., one hop, using the first edge server as a proxy) and/or through direct end-to-end connection (e.g., zero hop). The one-hop connection may make it possible to initiate communication with the second server, even before a direct connection is possible. At some point, the initial connection to the first server stops being used for application data and the connections to the second server start being used, where various transition modes may be supported, such as gradual or immediate). After a while, the endpoint may close its indirect path through the first edge server and only keep communicating directly with the second edge server. During the whole process, the same logical transport connection between the endpoint and the application on the first/second edge server may be maintained. This relocation process may, therefore, be transparent to the client application on the endpoint.

In some cases, maintaining connectivity, during a live application session, to an edge server while it is relocated/migrated requires either mechanisms in the network to maintain the IP address of the server (e.g., as used in data centers to migrate VMs), or application-layer redirection of the client towards the new server (e.g., SIP session continuity in the IP Multimedia Subsystem, IMS, in cellular networks). In one approach, there may be a mechanism disclosed herein that does not require maintaining the IP address and does not require support/awareness at the application-layer.

Figure 3:
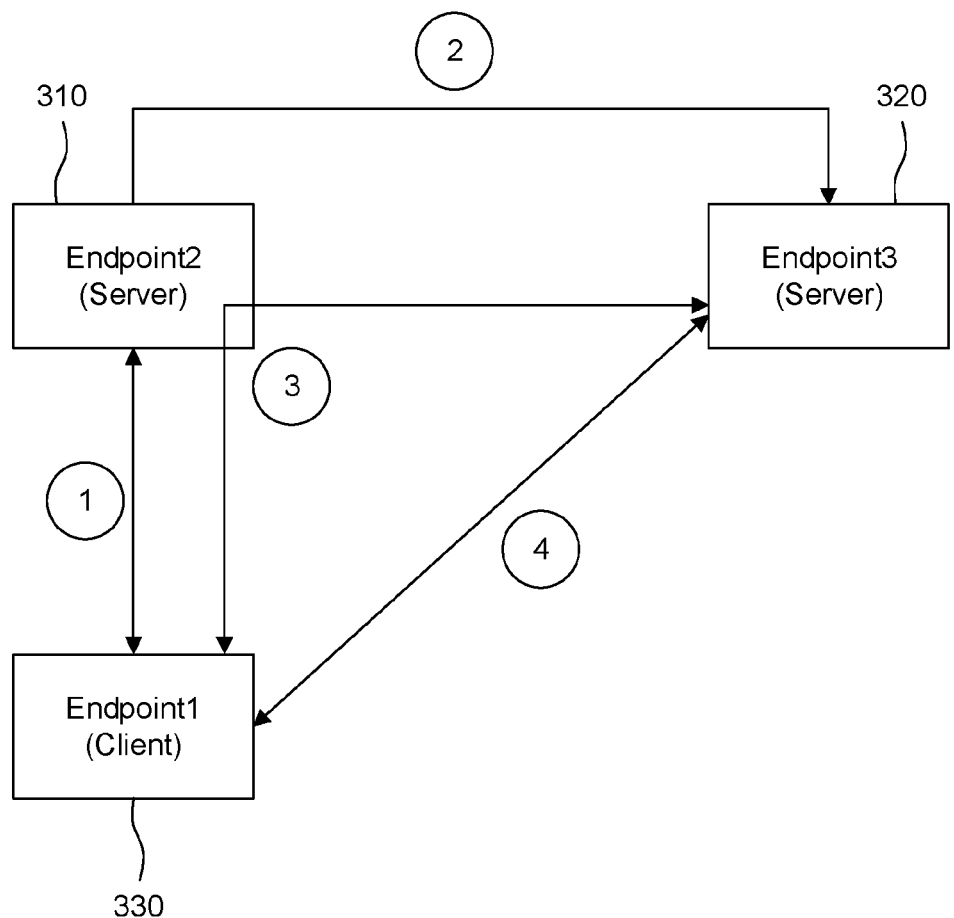
FIG. 3 is a diagram illustrating an example of maintaining connectivity to a relocating server.

FIG. 3 is a diagram that illustrates an example of maintaining connectivity to a relocating server. The example of FIG. 3 shows the use of MHMP in a relocation use case. For example, connection 1 depicts a connection between a client at endpoint1, denoted by element 310, connected to a server at endpoint2, denoted by element 320. Connection 2 depicts the path over which a server migration is performed between endpoint2 and the server at endpoint3, denoted by element 330. Connection 3 depicts the path over which endpoint2 may be used as a proxy to migrate the pre-existing connection, replacing endpoint2 with endpoint3. Connection 4 illustrates a direct path that gradually replaces the indirect path.

Some use cases may involve maintaining connectivity between intermittent D2D peers, such as in a smart city scenario. A first WTRU endpoint may connect to a second WTRU endpoint through an intermediate node, which may be an edge server hosting a VNF from the application provider, over an MHMP transport protocol. The application provider's instance on the proxy may therefore be aware of this connection and may decide to configure the access network (e.g., a 5G network) to enable D2D connectivity between these two endpoints. This D2D connectivity may, therefore, be charged to the application provider (e.g., which may recoup this cost through user subscription or advertisement agreements). When the endpoints are within range for D2D communication, the devices may establish a D2D link between them. Each endpoint may communicate its new IP address to the intermediate node over the MHMP protocol connection. Upon learning the new IP address of its peer, one of the endpoints may initiate a new direct path over the D2D connection. From there on, the endpoints may exchange, over the MHMP transport connection, traffic over one of, or both of, the D2D link and through the intermediate node in the network (e.g., transparently to the application using that connection). If the D2D link is lost, communication may still proceed through the intermediate node in the network.

Figure 4:
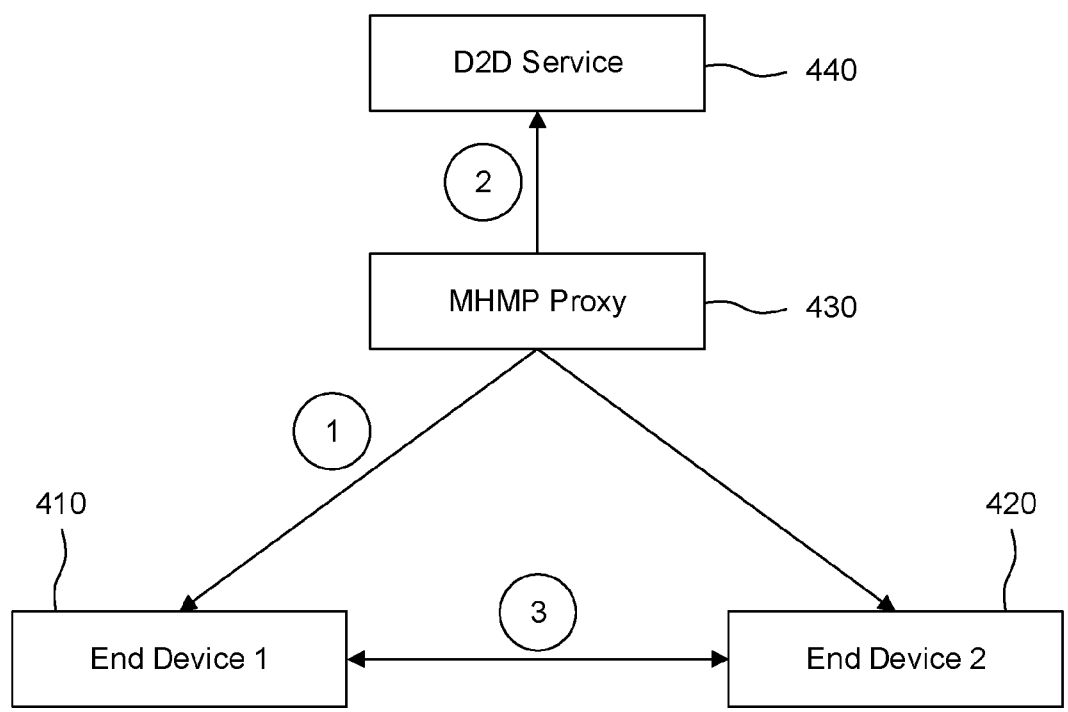
FIG. 4 is a diagram illustrating an example of maintaining connectivity between intermittent device-to-device (D2D) peers.

In some cases, it may not be possible to maintain the same transport connection between intermittent D2D peers. FIG. 4 is a diagram illustrating an example framework for maintaining connectivity between intermittent D2D peers. As shown in FIG. 4, connection 1 illustrates End Devices 1 and 2, respectively denoted by elements 410 and 420, connected through an MHMP Proxy 430. Path 2 illustrates the MHMP Proxy 430 requesting D2D communication to be enabled between End Devices 1 and 2. Connection 3 illustrates the establishment of a new path over D2D between End Devices 1 and 2 when within reach.

Some use cases may involve establishing and maintaining secure multicast, or publish-subscribe, connectivity between peers. In such use cases, the MHMP proxy may be used as a rendezvous point for multicast source and receivers, or for pubsub publishers and subscribers. The proxy may facilitate session key sharing between all endpoints and bootstrapping multicast communication. In cases where IP multicast is not usable, the unicast connections between endpoints and proxy may also be used to distribute data flow, which may be done in a scalable way using multiple proxies, in a hierarchical, content delivery network (CDN)-like architecture.

Figure 5:
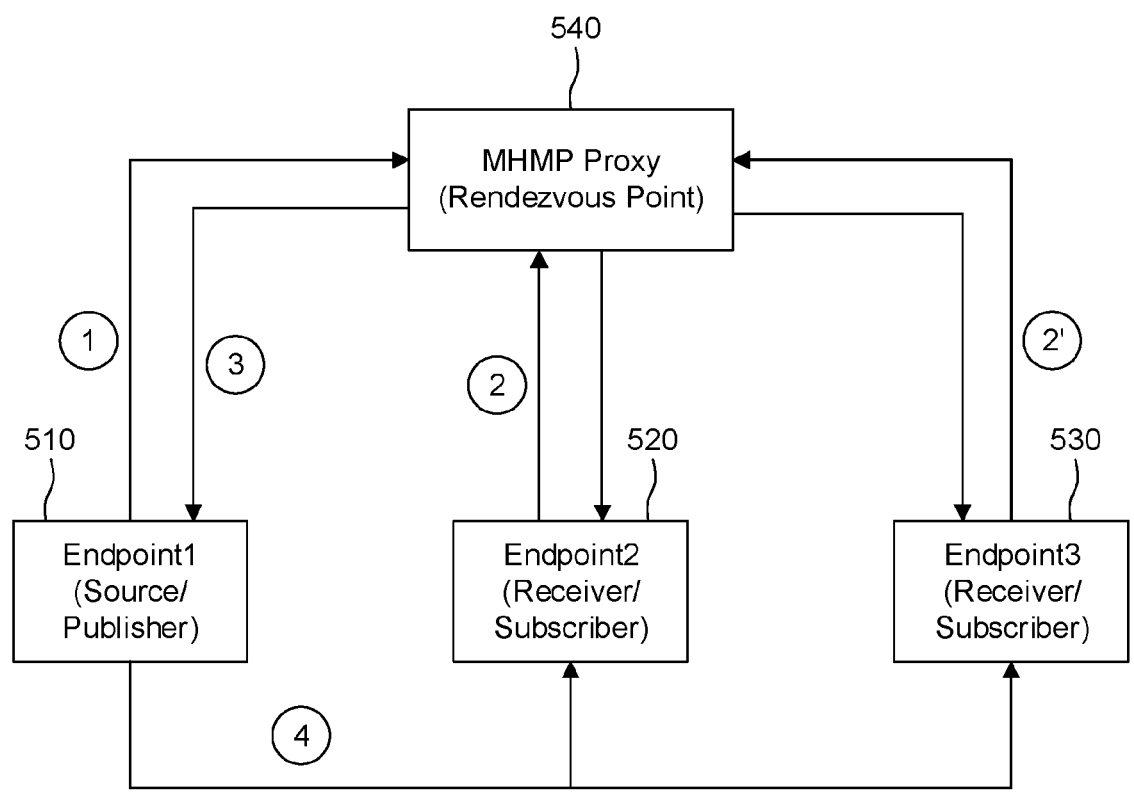
FIG. 5 is a diagram illustrating an example of establishing and maintaining secure multicast or publisher/subscriber (PubSub) connectivity over QUIC.

FIG. 5 is a diagram illustrating an example framework for establishing and maintaining secure multicast or PubSub connectivity over QUIC. As shown in FIG. 5, path 1 illustrates Endpoint1, denoted by element 510, establishing a connection as a source/publisher to a multicast group/pubsub topic through an MHMP Proxy 540. Paths 2 and 2' illustrate multiple Endpoints 2 and 3, denoted respectively by elements 520 and 530, establishing a connection as receivers/subscribers to the same multicast group/pubsub topic, receiving their QUIC session key from the MHMP Proxy 540. Path 3 illustrates Endpoint1 sending traffic over a unidirectional path that may be replicated towards all receivers/subscribers (e.g., using connections established in 1/2/2'). Path 4 may represent a multicast path between Endpoint1 and Endpoints 2 and 3 that may be established to complement or replace the initial path.

In some cases, MP transport protocols (e.g., MPTCP or MP-QUIC) may not support using one or more explicit hops (e.g., hops visible at the transport layer). Further, MP transport protocols may enable a selection of the network interface used by an endpoint (e.g., through the selection of a source IP address), but not the selection of a path through the explicit use of an intermediate node on this path. This may limit the amount of control the application provider and user have on the path. One or more embodiments described herein may enable such control, especially on modern transport protocols. In some cases, modern transport protocols design, using QUIC as a major example, may emphasize strong end-to-end security through encryption, as well as efficiency and flexibility, such as through multiplexing. In particular, QUIC goes beyond supporting HTTP only, by supporting multiplexing of streams and datagrams in the same connection. Therefore, there may be a need to enable a single, multiplexed, and secure end-to-end (e.g., where proxies may not have access to the encrypted portion of e2e packets) transport connection to be established over multiple paths including explicit hops. For this, several key issues may need to be addressed.

One issue may be that there is a need for a method to enable proxying of a secure end-to-end transport layer QUIC connection in a manner that is seamless (e.g., appearing as a normal QUIC connection), without data traffic overhead (e.g., without establishing a tunnel), and/or enabling multiplexing of multiple proxied connections, and/or enabling application-specific actions to be taken on the proxy (e.g., D2D setup, application-layer ID lookup, multicast key session sharing, etc.). This issue may not be specific to multipath transport, and may also be useful in regular (e.g., non-multipath) QUIC.

Another issue may be that there is a need for a method to dynamically advertise a proxied connection to a multipath connection peer (e.g., in MP-QUIC).

Another issue may be that one of the applications of multi-hop multipath may be to support server or client migration without breaking the transport connection. There may be a need for a procedure enabling this feature while keeping using the same secure transport connection before, during, and after the migration.

In one or more embodiments, there may be protocol extensions to handle indirect (e.g., proxied) paths, using as a base the existing QUIC protocol and its proposed multipath extension, since QUIC may be a secure transport protocol. Similar enhancements may also be derived for other transport protocols such as MPTCP+TLS, SCTP+TLS, Secure SCTP, and the like.

A core element of the approaches described herein may to have one or more nodes, called proxies or MHMP proxies herein, act as intermediaries in QUIC connections. MHMP proxies may be deployed by network operators, application, or service providers over a physical or virtual infrastructure. For example, an MHMP proxy controller application instance may be deployed over a virtualization infrastructure platform made available by an access network or data center operator. The proxy controller application instance may typically control forwarding, encapsulation/decapsulation, while those operations are performed in commercial off the shelf (COTS) or specialized hardware (e.g., a physical or virtual network appliance). The proxy controller application instance may use a programmatic, HTTP-based or SDN-based API (e.g., OpenFlow-based) to control those operations. The proxy controller application instance may also perform application-specific operations (e.g., as described with regard to the issues above).

Endpoints (e.g., QUIC endpoints) may also be a part of the MHMP system. Endpoints may be WTRUs, UEs, PCs, laptops, IoT devices, and the like, or more generally, any device that is able to communicate using the QUIC protocol, or a similar protocol that can be enhanced as described herein. Endpoints may act as MHMP proxies in some scenarios (e.g., in server migration scenarios described herein).

MHMP QUIC operation may be based on the operation of an MP-QUIC protocol. The enhancements described herein may be described using QUIC and MP-QUIC as a base protocol. An MP-QUIC connection between two endpoints is composed of one or more paths. An MP-QUIC path may be a uni- or bi-directional data flow between two endpoints. From the standpoint of each endpoint, a flow may be associated with a 4-tuple source/destination IP address and transport (e.g., UDP) port (as seen by the endpoint). Each endpoint may see a different 4-tuple for the same path, for example, when network address translation (NAT) is applied on the path. In MHMP QUIC, the same definition of a path may be used. In MHMP QUIC, each endpoint may see a different 4-tuple for the same indirect path, since for each endpoint, the next hop at IP and UDP layer is an MHMP proxy. MHMP-QUIC supports multiple concurrent indirect as well as direct paths.

Figure 6:
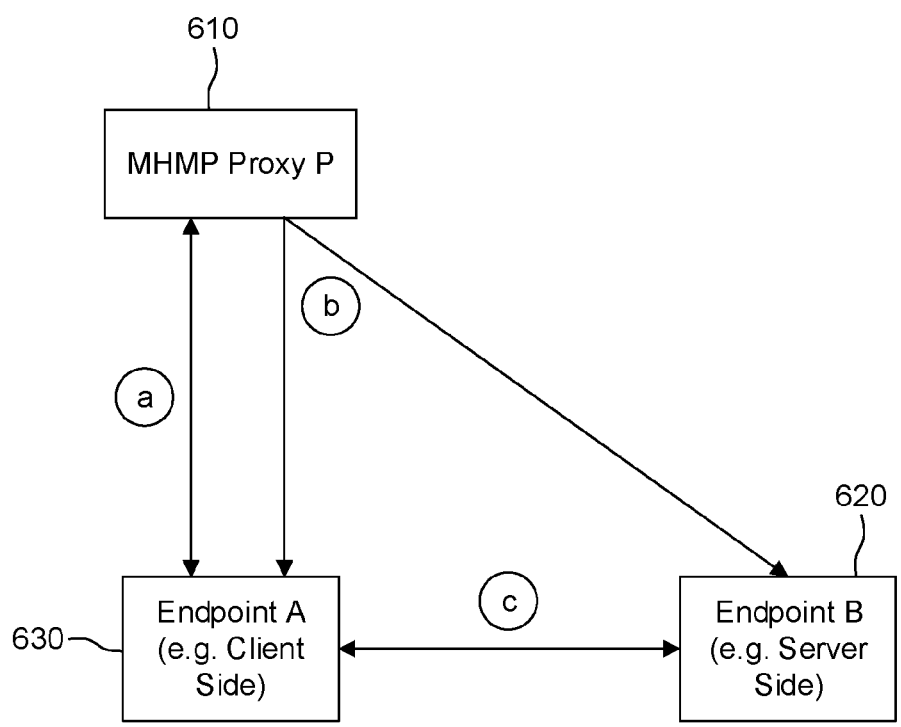
FIG. 6 is a diagram illustrating an example of main nodes and communication scenarios in a multi-hop, multipath (MHMP) system.
Figure 8:
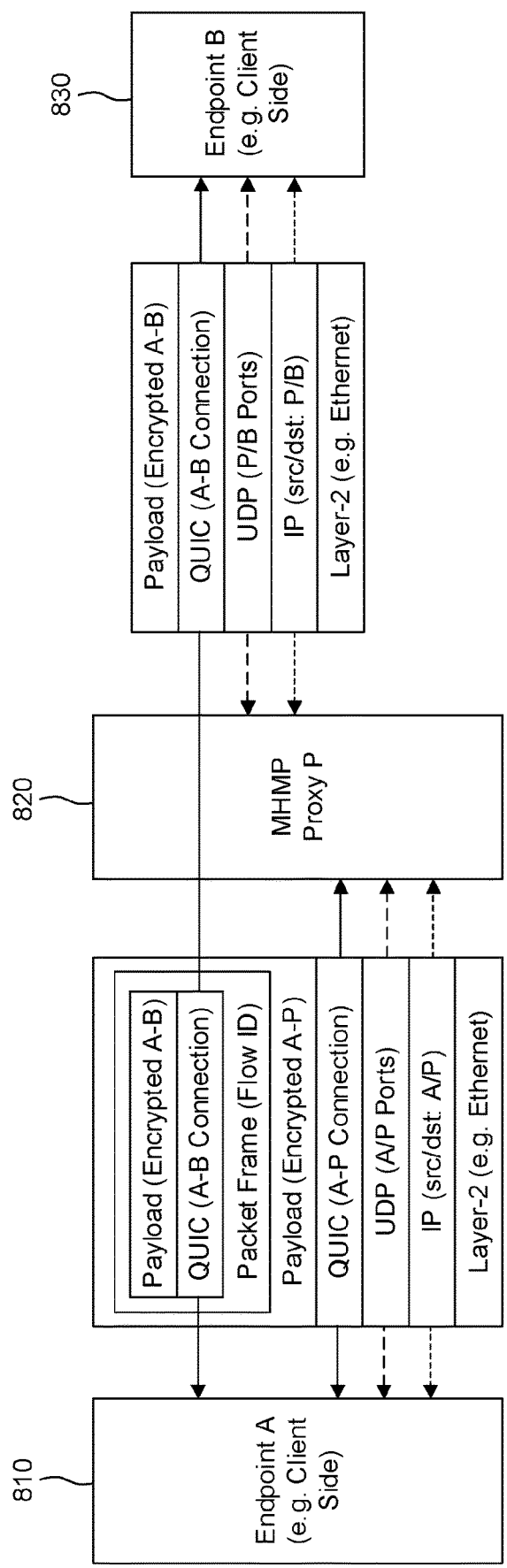
FIG. 8 is a diagram illustrating an example of a proxied or indirect connection using QUIC, depicting the involved nodes and packet structure.
Figure 9:
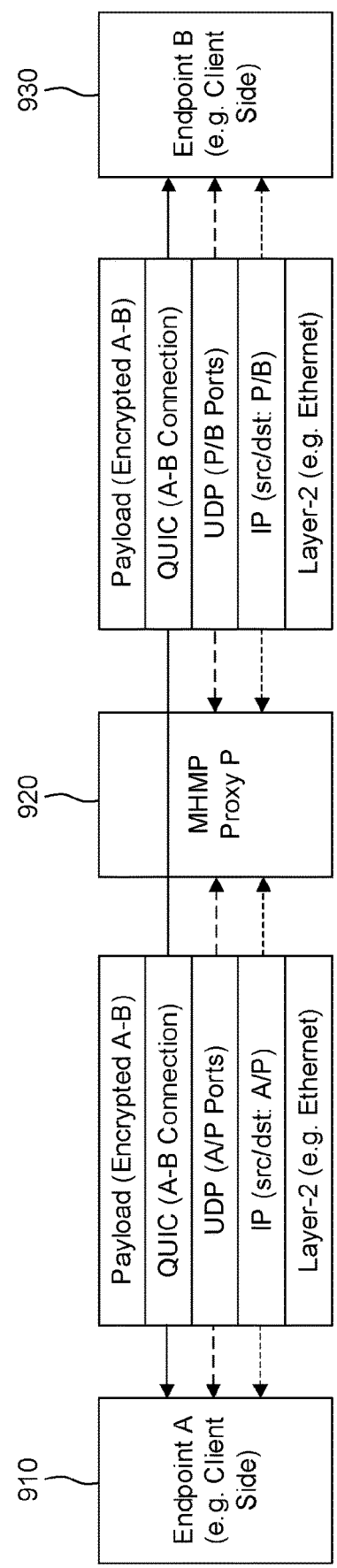
FIG. 9 is a diagram illustrating an example of proxied or indirect connection using UDP on both client-to-proxy and proxy-to-server segments, depicting the involved nodes and packet structure.

FIG. 6 is a diagram that illustrates examples of communication scenarios in an MHMP system. The diagram shows communication scenarios involving an MHMP proxy, as defined herein. These main communication scenarios using connections or paths (a), (b), and (c) may be detailed herein. In the scenario resulting in path (a), Endpoint A, denoted by element 630 of FIG. 6, may initiate communication with an MHMP Proxy P, denoted by element 610. This may create a regular QUIC connection or path (a), which is further illustrated in the example of FIG. 7, described further in paragraphs below. Endpoint A may send a request, to MHMP Proxy P using connection (a), for an indirect connection towards Endpoint B, denoted by element 620, following a procedure described herein. This may result in an indirect/proxied path connection (b) between A and B, using QUIC-over-QUIC on the segment between A and P, which is illustrated in FIG. 8 (e.g., using a PACKET frame type described herein) and described further in paragraphs below. This type of path connection may support multiplexing multiple indirect/proxied connections over the same QUIC A-P connection. Endpoint A or MHMP Proxy P may trigger switching to a no-overhead indirect/proxied path connection, using the SWITCH frame as described herein. This may result in the same QUIC path connection (b) being forwarded over UDP on each segment, as illustrated in FIG. 9 and described further in paragraphs below. A direct connection (c) may be established between Endpoints A and B, illustrated in FIG. 10, and further described below. Endpoint B may advertise indirect IP address to A on path (c), as described herein. Endpoint A may then initiate the creation of path (b) as described above. Direct and indirect path(s) may coexist in the same multipath, multi-hop QUIC connection.

Additional mechanisms may be implemented where, for example, path (a) may be used to exchange key session material enabling a multicast session between endpoints. In a case where proxy P is also an endpoint, generation ID information elements may be exchanged on path (b) to enable migrating an application instance from MHMP Proxy P to Endpoint B.

Figure 7:
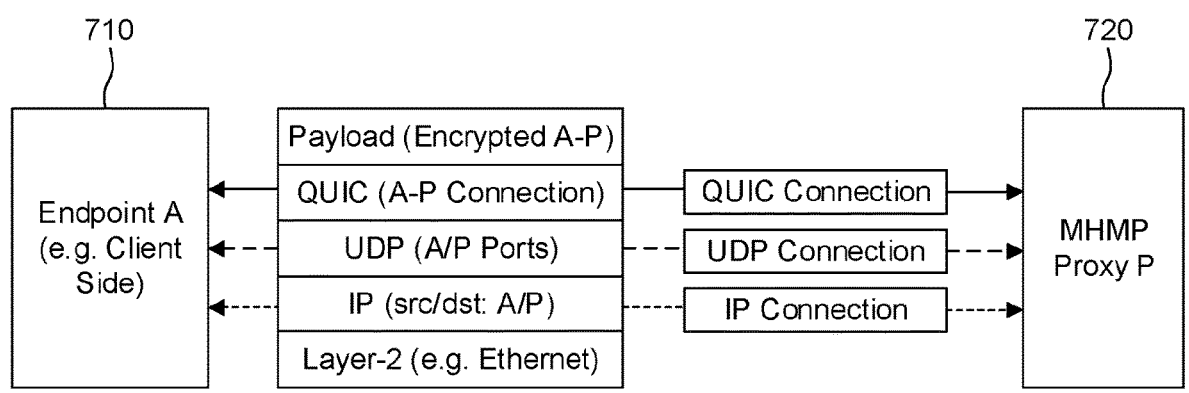
FIG. 7 is a diagram illustrating an example of an initial connection to a proxy, depicting the involved nodes and packet structure.

FIG. 7 is a diagram illustrating an example of a typical initial connection to a proxy, showing an example of the involved network nodes and packet structure. As shown, Endpoint A, denoted by element 710, may establish a QUIC (A-P) connection to an MHMP Proxy P, denoted by 730. In addition to the QUIC connection, the Endpoint A may also communicate using a UDP connection (between a UDP port on A and a USDP porn on P) and/or an IP connection (between IP addresses A and P). For example, the QUIC connection may be established via UDP and IP.

FIG. 8 is a diagram illustrating an example of proxied/indirect connecting using QUIC, depicting the involved network nodes and packet structure. An Endpoint A, denoted by element 810, may have established an inner QUIC connection (A-B) with Endpoint B, denoted by element 850. The QUIC (A-B) connection may be established over an outer QUIC (A-P) connection between the Endpoint A and the MHMP Proxy P, denoted by element 830. Encrypted payloads sent over the QUIC (A-B) connection may be encapsulated in a PACKET frame, as described above, which may include a flow ID identifying flows corresponding to the inner QUIC (A-B) connection. The outer QUIC (A-P) connection may carry an encrypted A-P payload towards the MHMP Proxy P, at which point the encapsulated QUIC (A-B) payload may be forwarded toward Endpoint B. Endpoint A and Endpoint B may be further connected via IP, and/or UDP.

FIG. 9 is a diagram illustrating a further example of a proxied/indirect connection over UDP on both segments, depicting the involved nodes and packet structure. An Endpoint A, denoted by element 910, may have established a QUIC connection (A-B) with Endpoint B, denoted by element 950. Additionally, connections between the Endpoint A and the MHMP Proxy P, denoted by element 930, and between MHMP Proxy P and Endpoint B, may be provided via UDP. Data sent over the QUIC connection (A-B) may be forwarded via a first UDP connection from Endpoint A to MHMP Proxy P, and again from MHMP Proxy P toward Endpoint B via a second UDP connection. Paths between Endpoint A and Endpoint B may be further provided via IP, and/or UDP.

Figure 10:
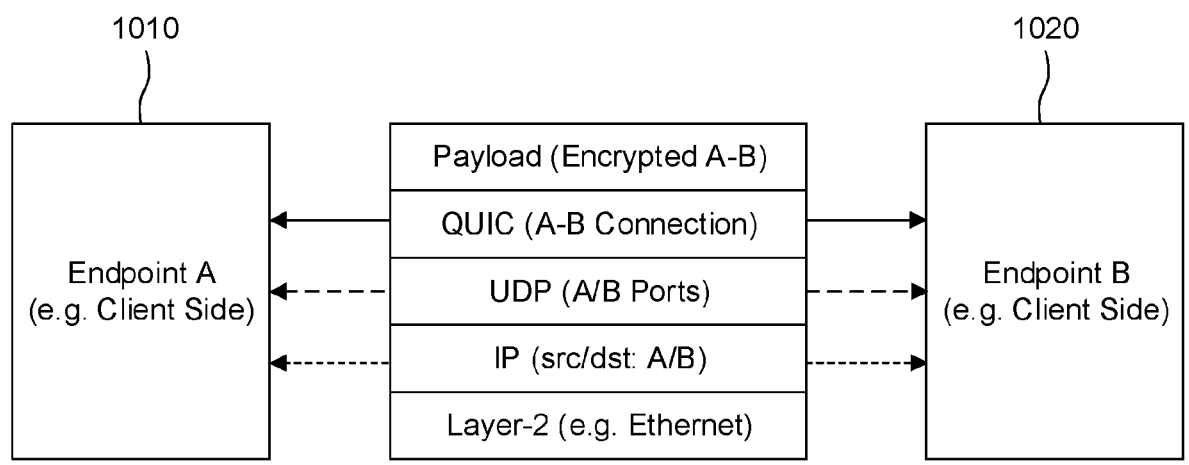
FIG. 10 is a diagram illustrating an example of a direct connection between endpoints, depicting the involved nodes and packet structure.

FIG. 10 is a diagram illustrating an example of a direct connection between endpoints, depicting the involved network nodes and packet structure. As shown, direct path connections may be established between Endpoint A, denoted by element 1010 and Endpoint B, denoted by element 1020. Endpoint A and Endpoint B may be connected via Layer-2 protocols, IP, and/or UDP. A QUIC connection (A-B) may be established, for example, upon request by Endpoint A according to one or several mechanisms described further herein.

In some cases, MPTCP may support proxies, however, an MPTCP proxy may be designed to split the TCP connection and, typically, enable MPTCP to be used between the proxy and the client on one side, while regular TCP is used between the proxy and the server. The MPTCP proxy is therefore on the path of the whole traffic between client and proxy. This type of connection split may not be possible with QUIC, which enforces end-to-end encryption on any given individual path of a multipath connection. The type of proxy that is described herein may, therefore, be different from the type of proxy used with MPTCP (e.g., it can be present on some paths and not others; there can be a two-way authentication between client and proxy prior to proxying the connection; an application instance on the proxy may be involved in the proxy connection setup), and consequently may rely on different mechanisms, described herein, and offer different types of services (e.g., implicit path selection, application-specific D2D or lookup, multicast or pubsub communication management).

HTTP CONNECT may be another proxy used in some cases as a connection establishment technique. When using HTTP CONNECT, the endpoints may communicate using any protocol over an end-to-end TLS connection passing through the proxy. The TLS connection may be transported over a first TCP session on the client-proxy segment, and a second TCP session on the proxy-server segment. HTTP CONNECT, as is, may therefore not be suitable for carrying QUIC traffic, which is UDP-based. Additionally, with HTTP CONNECT, there may not be a possibility to multiplex proxied connections between the client and the proxy. Therefore, multiple connections may be needed through the proxy to communicate with multiple servers. Finally, to be able to use HTTP CONNECT, a full HTTP connection may need to be established with the proxy, which can be wasteful of the resources of both client and proxy.

Table 2 illustrates examples of issues, and examples of mechanisms to address these issues. These example mechanisms may be enhancements to a QUIC protocol. In all cases of the table, the QUIC transport parameters may be extended to include related parameters, such as an indication that this connection may be used to carry QUIC-over-QUIC traffic, a list of supported protocols to address a remote endpoint in a proxy NEW_CONNECTION request, and/or, an indication of support for a GENERATION-based migration mechanism.

TABLE 2

Key Issues and Related Mechanisms

| Key Issues Addressed | Mechanisms |
| --- | --- |
| Seamless proxying with no traffic overhead or multiplexing, and application-specific action on proxy. | Endpoint sends NEW_CONNECTION frame to proxy, to initiate QUIC-over-QUIC proxying based on PACKET frames. Endpoint can send a SWITCH frame to replace the encapsulated proxy connection with the inner QUIC connection, i.e., replaces encapsulation with no-overhead forwarding. SESSION_KEY frame can be used to enable point-to-multipoint and multicast. |
| Advertisement of a proxied connection in MP-QUIC. | Endpoint sends ADD_ADDRESS frame type enhanced with proxy-related information elements. Receiving endpoint can use this information to initiate a path using QUIC-over-QUIC. |
| Seamless server or client migration support. | Server-side and client-side IP addresses are associated with a generation ID. E.g., server tells client to switch from old to new generation paths as part of a new migration procedure. This relies on new frame types GENERATION and STATE, and on enhanced frame types ADD_ADDRESS and PATHS. |

In some embodiments, there may be efficient connections through a proxy for QUIC or MP-QUIC. For example, there may be a proxy connection method using a QUIC-over-QUIC encapsulation scheme. This may be used for more than one purpose, such as: multiple QUIC connections to multiple servers can be multiplexed through a single proxy (e.g., over a same client-proxy connection); and/or, when multiplexing is not necessary (e.g., when a single QUIC connection is proxied), the proxied connection may be switched to directly carry the end-to-end QUIC connection without encapsulation, therefore reducing data traffic overhead to zero. In both cases, traffic between the endpoint and proxy may appear to be regular QUIC traffic. Like any other intermediate node on a QUIC connection, a QUIC-over-QUIC proxy may only have visibility over the unprotected fields of the QUIC packets, for example, IP header, UDP header, and unencrypted QUIC header (including the connection ID). MHMP proxy may implement application-specific actions.

There may be QUIC frame types used as building blocks used for efficiently connecting through a proxy for QUIC or MP-QUIC procedures. In the QUIC-over-QUIC encapsulation scheme, inner QUIC packets, where a packet is a complete processable unit of QUIC that can be encapsulated in a UDP datagram (e.g., can include one or more QUIC frames) may be transported over an outer QUIC connection (e.g., over the client-proxy connection). An end-to-end QUIC connection may be encapsulated as a uni- or bi-directional flow of inner QUIC packets: each inner QUIC packet may be transported in a PACKET frame, associated with a flow ID, and, inside the outer QUIC connection. A QUIC-over-QUIC flow may be initiated when the client endpoint sends a NEW_CONNECTION frame to the proxy, that identifies a new flow, including an ID and other parameters associated with the flow. Using flow IDs enable multiplexing, over a single endpoint-proxy connection, with multiple QUIC connections towards multiple endpoints. If the proxy accepts the NEW_CONNECTION request, it may configure itself to forward the inner QUIC packets to/from the NEW_CONNECTION destination.

A new PACKET frame type may be described herein to carry encapsulated data traffic. It may contain similar information element(s) as the DATAGRAM frame type. However, the new frame type may be useful in distinguishing its new unique usage as a container for inner QUIC packets. The inner QUIC packets belong to a QUIC connection previously initiated by a NEW_CONNECTION frame. A PACKET frame may include at least the following fields: a Flow ID (e.g., variable-length integer), which is an ID that identifies a uni- or bi-directional flow corresponding to one e2e QUIC connection, where this ID corresponds to the ID used in the NEW_CONNECTION frame that initiated the flow; a Length (e.g., variable-length integer), which is the length of the encapsulated packet stored in the data field; and/or, a Data field (variable length), which may be an inner QUIC packet, (e.g., one or multiple QUIC frames).

A new NEW_CONNECTION frame type may be described herein to define the destination/target and related parameters associated with a flow of inner QUIC packets/frames. This frame type may include at least the following fields: a Flow ID (e.g., variable-length integer), which may be an ID that identifies a bidirectional flow corresponding to one inner/encapsulated QUIC connection; a Target/destination protocol (e.g., 16 bits), which may be the protocol used to address the destination endpoint; a Target/destination IP address (e.g., 128 bits or 32 bits), which may be the IP address of the destination (e.g., endpoint2), or multicast IP address also known as multicast group, used if the destination address protocol is IPv4 or IPv6; a Target/destination Application Identity (e.g., variable length string), which may be an application-layer identity of the destination (e.g., endpoint2), used if the destination protocol is an application-layer protocol (e.g., this can be an application user ID, such as Netflix or Facebook username, which can be looked up by the proxy to determine the IP address of the destination endpoint, or this can be a topic ID or string, which the proxy can use as part of a publish-subscribe scheme); a Target/destination type (e.g., 2 bits), which may be a code indicating a type associated with the target/destination IP address or application ID, where values may include "publish", "subscribe", "bidirectional", and its meaning may depend on target/destination protocol (e.g., these values identify the sender of NEW_CONNECTION as a publisher or subscriber for a pubsub protocol, as a source or receiver for a multicast protocol, or as a regular node able to send/receive on the path); a Target/destination port (e.g., 16 bits), which may be a port (e.g., UDP port) to be used to connect to the server; and/or, a Proxy authorization field (e.g., a variable length string), which may be a string describing credentials for authorizing the proxy operation (e.g., may use the same encoding as in the corresponding HTTP field, such as "basic dXNlcjpwYXNzd29yZA=="). In cases where the same authorization string may be used for multiple NEW_CONNECTION frames, the Proxy authorization field may be present in the first NEW_CONNECTION and omitted afterward.

The Target/Destination protocol may be IPv4, IPv6, or an application-layer protocol (e.g., a username in a social network application). Depending on the target/destination protocol, any of a target/destination IP address, port and application identity may or may not be present (e.g., an IP address and port may be present with IPv4/IPv6 protocols, and an application identity and type may be present with application-layer protocols).

PACKET frames associated with a given flow ID may be handled as a separate QUIC stream/flow and therefore be multiplexed with other streams/flows. Congestion control may be applied to the whole client-proxy QUIC connection.

In relation to the NEW_CONNECTION/PACKET frame types and related mechanism, a QUIC stack implementation may make a programmatic API available to local applications running on the host (e.g., on the proxy). A process running on the proxy node may use this API and register for a "NEW_CONNECTION received" event, passing a callback as a parameter. The registration scope may be for all, a group of, or one incoming connection. The callback may receive parameters including the NEW_CONNECTION frame information elements (flowID, destProtocol, DestIP, DestAppId, DestType, DestPort, ProxyAuth). When the proxy receives a NEW_CONNECTION, it may call registered callback functions and provides the parameters extracted from the NEW_CONNECTION frame. A callback function may, for example, use the ProxyAuth parameter to check the client endpoint is authorized by a local policy, and return a code indicating the request is accepted or rejected. In some examples, a callback function may look up the Destination Application Identity passed in the NEW_CONNECTION (e.g., using a local or remote application layer database), to determine the caller is authorized to connect to it, and to determine the IP address and UDP port of the endpoint towards/from which the proxy will forward inner traffic. In some examples, a local program on the proxy may expose this API as a REST API for outside nodes (e.g., application provider management plane function, to control NEW_CONNECTION requests).

There may be a SWITCH frame used for efficiently connecting through a proxy for QUIC or MP-QUIC procedures. Specifically, in order to remove encapsulation and overhead when possible, a client endpoint (resp. proxy) may send a new SWITCH frame to the proxy (resp. client endpoint) to request switching from exchanging e2e traffic encapsulated over the proxy connection, to exchanging e2e traffic directly over UDP.

A new SWITCH frame type may have one or more of the following fields: a Switch type (e.g., a variable-length integer), which may be a code indicating the type of switch needed, which may be in the method described herein, "from QUIC-over-QUIC to QUIC-over-UDP", although it may also take other values such as "from QUIC-over-UDP to QUIC-over-QUIC" that may enable reversing of the operation described herein, or other values corresponding to switching between different types of encapsulations (GTP, Geneve, etc.). The SWITCH frame type may also include a Message type (e.g., a bit), which may be a code indicating if the frame is a request or response; or a Status (e.g., a fixed-length integer), which may be a code indicating success/failure, and which may be used in the response.

The requester (e.g., the client endpoint or the proxy) may send a packet containing a SWITCH frame. The receiver may decide to accept or reject (e.g., the proxy may be configured to always accept or reject those requests, based on operator policy), then send a reply in a QUIC packet containing a SWITCH frame. The receiver may stop sending packets on the connection (e.g., the client-proxy connection) after sending a positive response. The requester may stop sending packets on the connection after receiving a positive response. The requester, after sending a receiving response, and the receiver, once it receives the acknowledgment of a positive response packet, may start sending unencapsulated end-to-end packets on the UDP connection of the initial connection. A SWITCH sent on a connection with multiple active proxied connections (e.g., multiple flow IDs) may typically be rejected, since after a successful switch the flow IDs may not be associated with inner QUIC packets anymore, which may make multiplexing impossible without additional complexity (e.g., communication with the server-side to ensure that connection IDs are allocated in certain ranges, in a similar way to existing QUIC load balancing methods).

SWITCH may be used at any point in the lifetime of the inner QUIC connection, such as: once the encapsulated protocol is sufficiently well encrypted/protected (e.g., once the traffic is at "1-RTT encryption level"); later on, such as during normal QUIC-over-QUIC operation; and/or, as early as with a NEW_CONNECTION request. Using SWITCH once reaching the 1-RTT encryption level may keep earlier unprotected and 0-RTT-protected packets encapsulated, and therefore encrypted, over the outer QUIC connection. This way, no clear packets may be visible to an eavesdropper between client and proxy, which hides the fact that a proxied connection is being established. Instead, the SWITCH operation may appear as a change of the connection ID, which may be common in QUIC protocol operation. This, therefore, makes the proxying operation as seamless as possible. Procedures as described in FIG. 11 and described in paragraphs below may illustrate this particular use case; however, SWITCH may also be sent earlier, for example, in the procedures described below with respect to FIGS. 11A and 11B, steps 1113-1117 may occur between step 1104 and 1105, in which case the first packet of the end-to-end connection, and all subsequent packets, may be transported over a UDP connection on each segment client-proxy and proxy-server.

Indirect connection bootstrapping method(s) may be used for efficiently connecting through a proxy for QUIC or MP-QUIC procedures. This may be a procedure that bootstraps a proxied QUIC connection, using the previously described new frame types. This method may be used to establish an indirect path connection as part of an e2e MHMP connection, or it may be used to establish a single QUIC proxied connection.

Figure 11A:
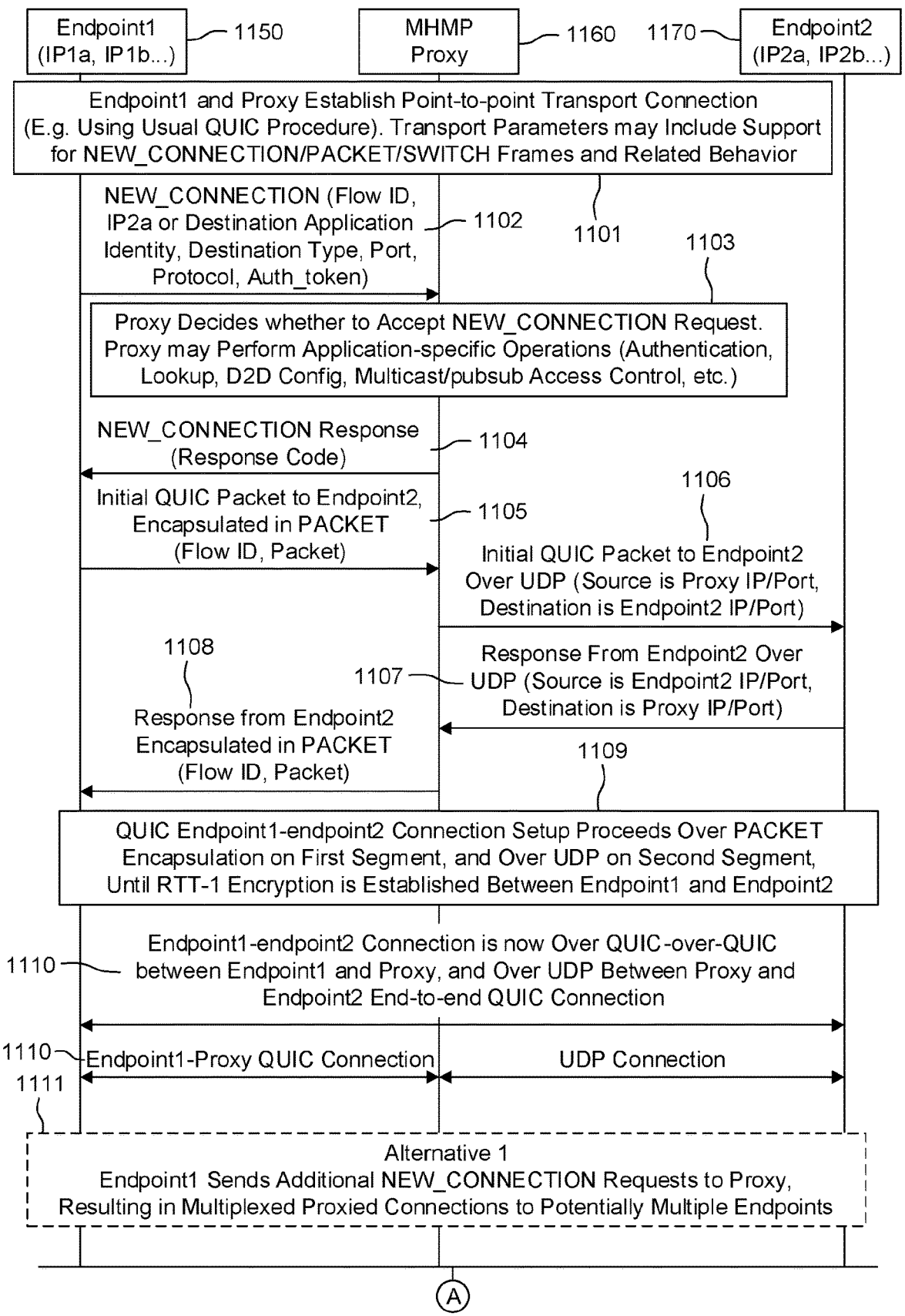
FIG. 11 is a diagram illustrating a first portion of an example of an indirect connection bootstrapping method with a first alternative establishing multiple QUIC connections.
Figure 11B:
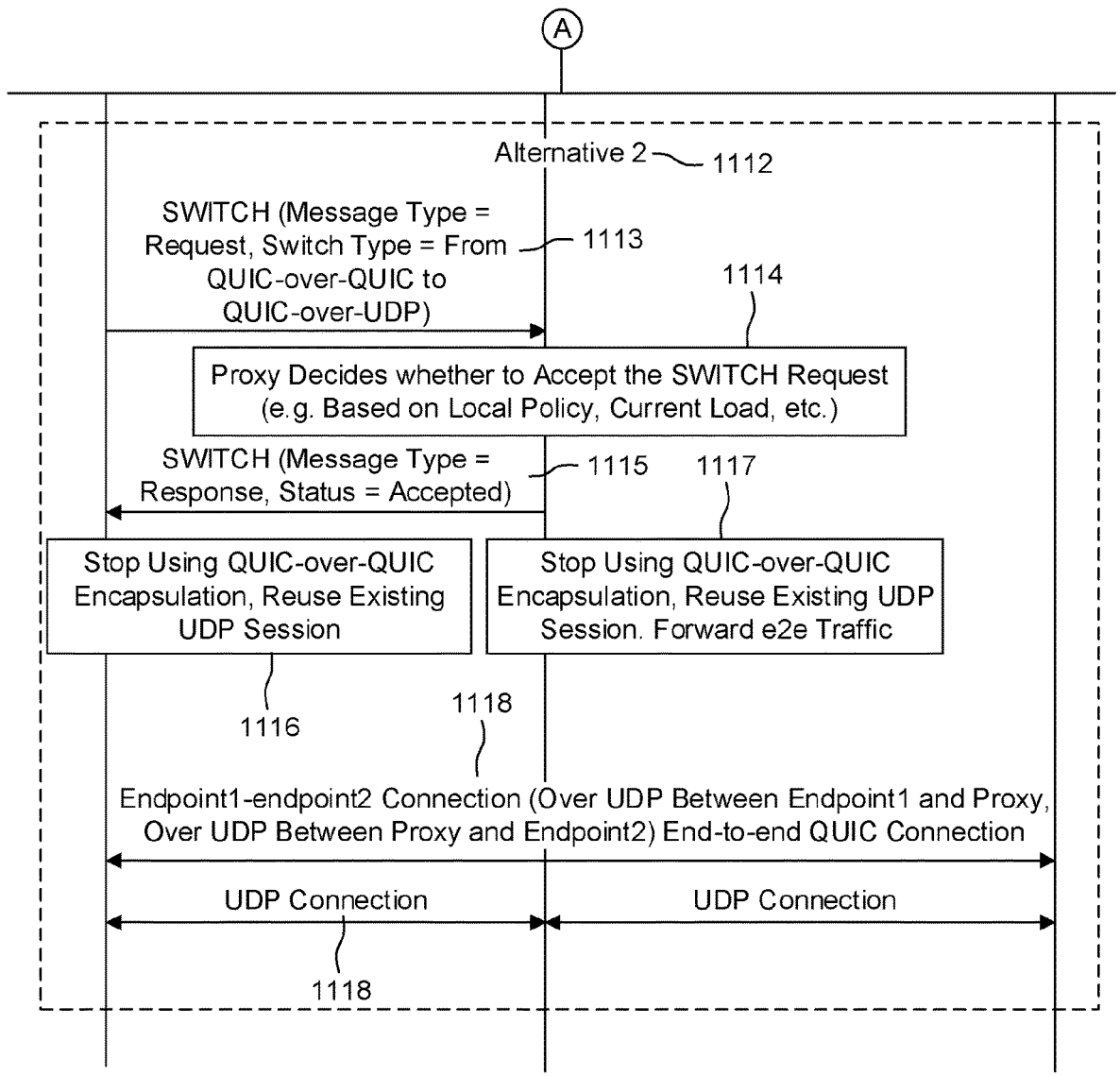

FIGS. 11A and 11B show a process diagram illustrating an example of indirect connection bootstrapping methods. FIG. 11 shows how, for example, Endpoint1, denoted by element 1150, (e.g., using IP addresses IP1a, IP1b, etc.) connects to Endpoint2, denoted by 1170, (e.g., using IP addresses IP2a, IP2b, etc.) through a proxy 1160. To distinguish it from other proxies, this proxy may support PACKET/NEW_CONNECTION frame types, and possibly the SWITCH frame type, and may be an MHMP proxy, even if it could also be used in non-multipath QUIC as well.

Regarding the steps shown in FIGS. 11A and 11B, at 1101, the Endpoint1 may establish a QUIC connection to the proxy. The proxy may authenticate the client (e.g., based on a certificate provided by the client). In some cases, QUIC may support server authentication by the client only, but may be extended to support client authentication by the server.

Endpoint1 may further use this QUIC-layer connection to carry HTTP/3 traffic, in order to log in, authenticate, and the like using usual Web-based mechanisms (Web Authentication (WebAuthn), HTTP basic authentication, JSON Web Token, two-factor authentication methods, etc.). Nevertheless, this step may not be necessary in all cases and may impose some processing overhead on both endpoints and proxy.

During Endpoint1-Proxy transport connection establishment, transport parameters may be exchanged (e.g., using the QUIC Transport Parameters Extension). The Proxy and/or Endpoint1 may indicate support for new fields and related procedures described herein, with transport parameters such as Transport parameter IDs.

For example, a Transport parameter ID with proxy operation support (e.g., 0x000f), may have or include a transport parameter length, such as 0 bit (e.g., empty parameter)), and this transport parameter may indicate that the sender supports the frame types NEW_CONNECTION, PACKET, SWITCH and associated proxy-related procedures described herein.

For example, a Transport parameter ID with proxied protocols supported (e.g., 0x0010), may have a transport parameter length, such as variable-length list of integers, and this transport parameter may list one or more protocols that are supported to address remote endpoints in a NEW_CONNECTION frame (e.g., IPv4, IPv6, application-layer protocols).

At 1102, the Endpoint1 may send a NEW_CONNECTION frame to the proxy, including a previously unused flow ID (e.g., 0 in the initial request) and indicates the desired server endpoint IP address (e.g., IP2a, or a multicast IP address) or a destination application identity (e.g., application-specific username, pubsub topic name), type, port, protocol, and possibly an authorization token.

At 1103, the proxy may decide whether to authorize the NEW_CONNECTION request, based on the given parameters, local policy from the proxy operator, and possibly some interaction with a backend service in the Cloud. When applicable, the Proxy may perform application-specific actions, such as: enable D2D connectivity between endpoint1 and endpoint2 to authorize Endpoint1 and Endpoint2 to establish a direct path between them later (e.g., proxy may access a 5G network API for this); performing application-layer authentication with the client; and/or, performing lookup of the application identity provided in the NEW_CONNECTION (if application identity is used instead of IP address).

At 1104, the proxy may send a NEW_CONNECTION response (e.g., including a response code indicating the request is accepted).

At 1105, the client Endpoint1 may send an initial end-to-end packet towards Endpoint2, encapsulated in the initial QUIC connection to the proxy, using a PACKET frame as described herein, using flow ID used in NEW_CONNECTION.

At 1106, the proxy may decapsulate the packet and send it to the server Endpoint2, sometimes over a UDP packet (e.g., using proxy IP address/UDP port as a source IP address/UDP port).

At 1107, Endpoint2 may send a QUIC response to the initial packet (e.g., as per a QUIC connection establishment procedure).

At 1108, the Proxy encapsulates endpoint2's response into the initial endpoint1-proxy connection, in a PACKET frame (e.g., using the same flow ID as in the request).

At 1109. this Endpoint1-Endpoint2 exchange may continue until the end-to-end connection is established, following the end-to-end QUIC connection establishment procedure, transported over two segments, where packets are encapsulated over QUIC on the endpoint1-proxy segment, and sent over UDP on the Proxy-Endpoint2 segment. To enable this, a packet forwarding operation may be configured on MHMP proxy, for example as an entry in a forwarding table associating the flow ID used in PACKET frames with the second segment UDP session 4-tuple (e.g., MHMP Proxy IP address and UDP port, Endpoint2 IP address and UDP port).

At 1110, at this point, the Endpoint1-Endpoint2 QUIC connection may be established end-to-end, and may be transported over the aforementioned two segments.

The example procedure of FIG. 11 may progress to step 1111 or step 1112, depending on different cases.

At 1111, in a first alternative, a client Endpoint1 may send additional NEW_CONNECTION frames, using different flow IDs, to multiplex multiple proxied connections over the client-proxy QUIC connection. The procedure may therefore loop over steps 1102-1110. The procedure may end here in this alternative.

FIG. 11B shows a second portion of the process diagram, and describes an alternative to the steps described above with respect to step 1111. As shown in FIG. 11B, At 1112, in the second alternative, the client Endpoint1 may not need to use multiplexing and decides to reduce the overhead of the proxied connection. At this stage, the end-to-end connection may be protected at the 1-RTT (e.g., highest) level (e.g., since step 9). QUIC-over-QUIC encapsulation may therefore be adding an unnecessary overhead on the connection (e.g., since no multiplexing is necessary).

At 1113, Endpoint1 may send a SWITCH message (e.g., request, with switch type "from QUIC-over-QUIC to QUIC-over-UDP") to trigger the replacement of the initial connection by the end-to-end inner connection (over the same underlying UDP flow). Note that, alternatively, the Proxy may also be the sender of the SWITCH frame.

At 1114-1115, the recipient (e.g., the Proxy) may decide whether to accept or reject the SWITCH request and sends back a response (e.g., with a code indicating the request is accepted).

At 1116-1117, the Endpoint1 and proxy may start exchanging end-to-end (e.g., Endpoint1-to-Endpoint2) packets directly over UDP. On the MHMP Proxy, a forwarding operation may be configured, for example as an entry in a forwarding table associating the first segment 4-tuple (e.g., endpoint1 IP address and UDP port, MHMP proxy IP address and UDP port) with the second segment 4-tuple (e.g., MHMP proxy IP address and UDP port, endpoint2 IP address and UDP port).

In step 1118, from this point on, end-to-end packets on the QUIC path between Endpoint1 and Endpoint2 may be sent through the proxy, which may forward them over UDP connections on each segment Proxy-Endpoint1 and Proxy-Endpoint2.

Proxies may be used in multipath transport protocols for efficiently connecting through a proxy in QUIC or MP-QUIC procedures. An MP-QUIC signaling and procedure may be used to establish individual indirect paths as part of a multipath connection. When used along with the QUIC-over-QUIC mechanism and/or SWITCH-based mechanism described previously herein, these procedures may enable establishing individual paths through a proxy. Scheduling of traffic between (e.g., direct and indirect) paths may be done similarly to regular MP-QUIC scheduling. Additionally, or alternatively, an MHMP-QUIC endpoint may use its knowledge of the indirect or direct nature of a path (e.g., known from new ADD_ADDRESS frame type fields described herein) to influence the scheduling strategy. Reasons to deploy and use proxies may vary, possibly depending on the goals of an application or service provider and may therefore result in different or even opposite strategies. For example, an MHMP-QUIC client may use indirect paths when available, for example, because it values path diversity over other considerations, and keeps direct paths inactive, as backup paths. In another example, where MHMP proxies are used to establish backup paths over satellite links, an MHMP-QUIC client may use direct paths when available and keep indirect paths inactive for backup.

Furthermore, an MHMP path may pass through more than one proxy. This may be hidden from the endpoint: each proxy may decide which other proxies to use as next hop, and subsequently, establish a proxy connection to the other proxy. A proxy may forward NEW_CONNECTION and SWITCH frames to the next proxy, and relay back the response. Those frames may, therefore, be forwarded all the way to the last proxy on a path.

Multicast and Pubsub communication may be enabled for efficiently connecting through a proxy in QUIC or MP-QUIC procedures. A QUIC multicast protocol may use the HTTP alternate services ("Alt-Svc") to obtain a session key. MHMP protocol may be leveraged in complement to this existing work, to provide additional features. For example, it may enable sharing of session keys at the transport layer, which may be more efficient/dynamic than using HTTP Alt-Svc. The MHMP protocol may also enable use of IP unicast in complement or in replacement to IP multicast, in scenarios such as video broadcasting, or pubsub point-to-multipoint message distribution (e.g., MQTT). In replacement, using multiple distributed proxies along with unicast may be both scalable and easy to deploy in deployments where multicast is not allowed in a network. In complement, multicast may be allowed in some portions of the network, where it may be used to improve distribution efficiency.

Multicast and pubsub nodes may connect to a proxy and use the NEW_CONNECTION frame using target/destination application ID and target/destination type. Multicast stream sources/receivers may set destination IP addresses to a multicast group, and destination type respectively to "publish" and "subscribe". Pubsub publishers/subscribers may set destination application ID to the topic name, and destination type respectively to "publish" and "subscribe".

The procedures described in FIGS. 11A and 11B may be used, for example, where multicast/pubsub nodes (e.g., source, receivers, publishers, subscribers) all have the role of Endpoint1. Endpoint2 may be, in this case, a virtual endpoint, which may, for example, be hosted on the MHMP Proxy itself. Roles of Endpoint2 may include facilitating key distribution and maintaining/configuring forwarding of QUIC flows between endpoints. A single instance of Endpoint2 may be needed for each multicast group or pubsub topic.

Initially, a source/publisher endpoint may connect to Endpoint2, as described herein. At the end of this procedure, source/publisher may be able to stream data to endpoint2, over a QUIC connection "S" (e.g., traffic sent to endpoint2 may be discarded by proxy if there is no receivers/subscribers). Endpoint2/proxy may store the QUIC session key in its internal state, associated with the multicast group or topic name, for future use.

Receivers/subscribers may also connect to Endpoint2 as described herein, until they send a NEW_CONNECTION. Endpoint2/Proxy, if it accepts the request to subscribe to the multicast group or topic name, may reply with a SESSION_KEY frame including the key material needed to decrypt the QUIC traffic from source/publisher for this multicast group or topic name. The receiver/subscriber may process this frame and configure its QUIC connection to the proxy with the session key material. From this point on, the receiver/subscriber may decrypt packets sent by the source/publisher on connection "S". Endpoint2/proxy may configure forwarding rules on the proxy to forward a copy of all incoming packets on connection "S" towards the receiver/subscriber, over the existing UDP connection to the receiver/subscriber.

At this point, a point-to-multipoint connection may exist between the source/publisher endpoint and receiver/subscriber endpoints, over unicast point-point UDP connections between each endpoint and the MHMP Proxy. Endpoint2/Proxy may receive the stream, but not modify it or send any data on it. Endpoint2/Proxy may communicate with Endpoint1 over the Endpoint1-Proxy connection (e.g., to provide statistics over the number of subscribers/receivers). Source/publisher may advertise actual multicast IP addresses (e.g., using ADD_ADDRESS). Upon reception of the ADD_ADDRESS, a receiver/subscriber may set up a new path listening to the multicast address. The receiver/subscriber may close or keep as unused backup the unicast path through the MHMP Proxy.

In some embodiments, there may be proxy discovery through MP-QUIC. There may be multiple ways for endpoints to learn about a suitable proxy from a mechanism, such as DHCP, IPv6 ND, and Provisioning Domains, DNS service discovery, local discovery using mDNS, port control protocol, and/or any cast addresses. Nevertheless, these methods may be suited to discover long term proxies deployed by network operators. For some of the use cases described herein, a more dynamic method may be needed for discovering proxies deployed by application providers. Therefore, there is a need for how an endpoint can learn about a proxy it can use for indirect paths in a multipath protocol.

In this approach, an endpoint may learn about an available indirect path from its remote peer, over an existing path. The endpoint may use this indirect path right now, in the same connection, or later in another connection to the next endpoint.

Enhanced ADD_ADDRESS frame type may be used for proxy discovery. Normally, an ADD_ADDRESS frame type may have several fields, such as: a "P" bit which may indicate, if set, the presence of the Port field; an Address ID, which may be a unique identifier for the advertised address for tracking and removal purposes, where this may be needed when, for example, a NAT changes the IP address such that both hosts see different IP addresses for the same path endpoint; an Interface Type, which may indicate the interface technology type such as fixed (0), WLAN (1) or cellular (2); an IP Version which may be related to the address in the IP Address field; an IP Address, which may be the IP address advertised by the sender to the receiver; and/or, the UDP port number, which may be related to the advertised IP address.

In an enhanced/extended ADD_ADDRESS frame type there may be several fields, such as: an "I" bit, which, if set, may indicate the presence of proxy-related fields; an "A" bit, which, if set, indicates the proxy may be used for all connections to the sending endpoint, and if not set, indicates the proxy may only be available for this multipath connection; the Proxy IP address, which may be the IPv6 or IPv4 address of the proxy, as seen by the receiving endpoint (e.g., a public-facing IP address of the proxy), and in an alternative, the proxy IP address field may be replaced with a proxy name field (e.g., a FQDN); the Proxy IP version, which may indicate whether the IP version of the proxy IP address field is IPv4 or IPv6; and/or, the Proxy Port, which may be a transport layer (e.g., UDP) port associated with the proxy IP address. These fields may be in addition to the normal fields and may be required to make it possible for the endpoint receiving this frame to initiate the indirect path connection through the proxy, as previously described herein.

Figure 12:
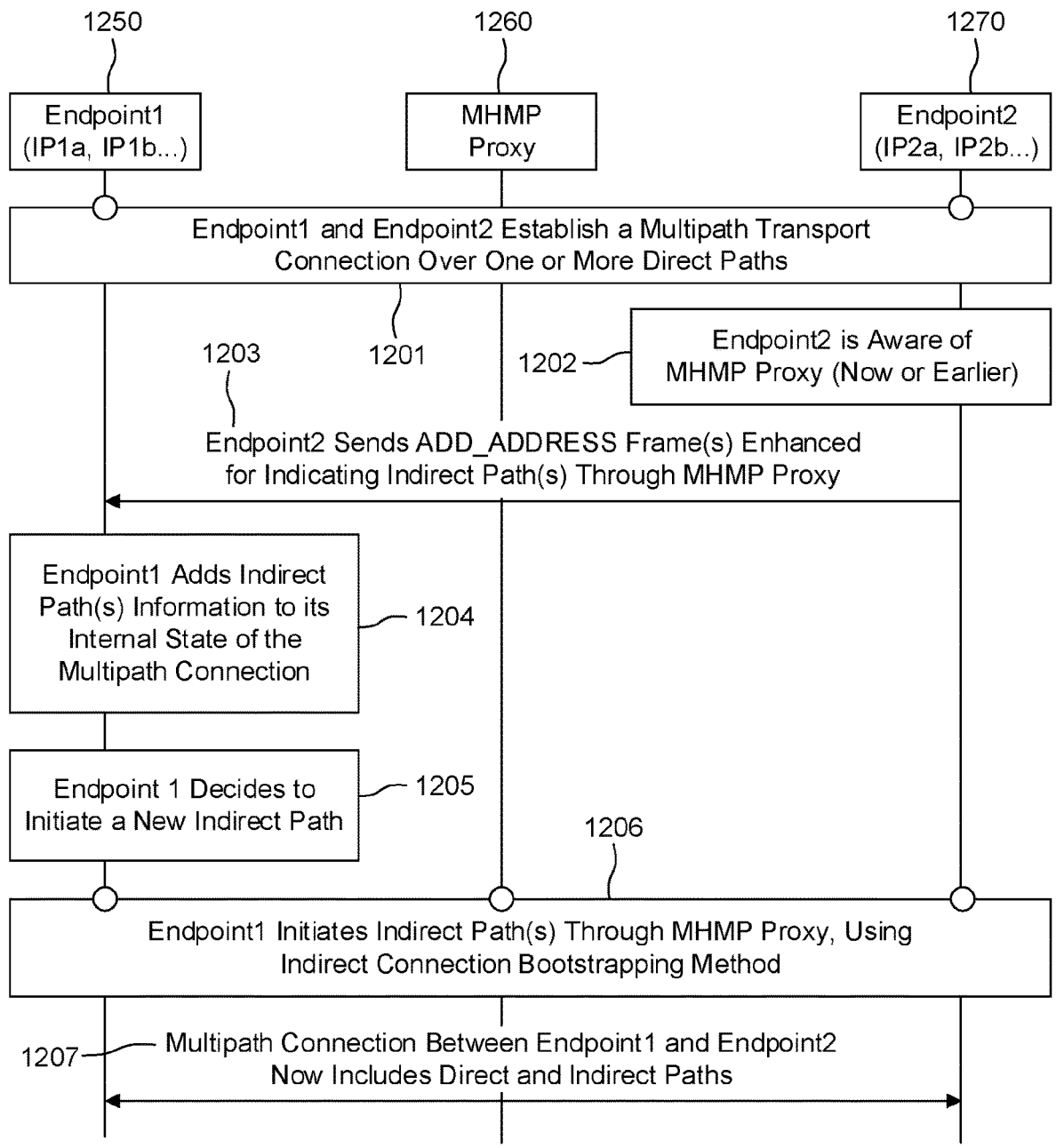
FIG. 12 is a diagram illustrating an example of a proxy discovery procedure using ADD_ADDRESS.

Using the techniques described herein, there may be a proxy discovery procedure using ADD_ADDRESS. FIG. 12 is a process diagram illustrating an example of a proxy discovery procedure making use of the enhanced ADD_ADDRESS and the indirect connection bootstrapping method described herein.

Regarding the steps as shown in FIG. 12, at 1201, an Endpoint1, denoted by element 1250, may establish a multipath transport connection with Endpoint2, denoted by element 1270, over one or more paths (e.g., using existing MP-QUIC procedure for direct path(s) and/or a method described herein for indirect path(s)). There may be at this point an MHMP connection between Endpoint1 and Endpoint2, composed of a set of direct or indirect paths.

At 1202, the application provider may dynamically deploy a Proxy instance now or may have deployed it earlier. As shown in FIG. 12, the Proxy is denoted by element 1260, and may be an MHMP Proxy. The existence and IP address/port of a proxy may be made available to Endpoint2 (e.g., over a management plane communication mechanism, possibly along with policy information on the usage conditions for this proxy). For example, a given proxy may be usable for all application users located in a particular region or for all application users with a particular plan.

At 1203, an Endpoint2 (e.g., the server) may become aware of a proxy that Endpoint1 (e.g., the client) may use for this connection or for all connections to this server. This information may be configured on the server, provided through a management plane system, or using another method. Endpoint2 may send a packet including an ADD_ADDRESS frame including, besides the usual ADD_ADDRESS fields, the Proxy IP address, version and port to use, with the "I" bit set to indicate the presence of Proxy information, and when applicable the "A" bit set to indicate that the Proxy may be used for other connections to the server. Endpoint2 may send several ADD_ADDRESS frames (e.g., to advertise multiple proxies, and/or multiple Endpoint2 IP addresses through a proxy).

At 1204, upon reception of the ADD_ADDRESS frames, Endpoint1 may update the local connection state with the ADD_ADDRESS parameters.

At 1205, at some point, such as immediately or based on a local policy decision (e.g., if the current path becomes unreliable), the (e.g., enhanced MP-QUIC) path manager component on Endpoint1 decides to initiate a new path using information from one of the recently received proxy-based ADD_ADDRESS frames.

At 1206, the Endpoint 1 may initiate an indirect path connection setup through the Proxy learned from ADD_ADDRESS, such as using the procedure described in FIG. 11.

At 1207, at this point, the multipath connection between Endpoint1 and Endpoint2 may now include the new indirect path through MHMP proxy, in addition to all pre-existing paths.

In some embodiments, there may be an enabling server (or client) migration. This approach may address how the MHMP protocol mechanism described herein can be used to facilitate application connectivity continuity during a server or client migration. One advantage of this method may be that the endpoint does not need to discover the newly migrated remote endpoint through an external protocol (e.g., DNS, application layer protocol, etc.); another advantage may be that the transport session is maintained, which enables a transparent migration.

In enabling server or client migration, there may be new building blocks, such as new GENERATION, STATE, and enhanced ADD_ADDRESS and PATHS frame types.

A method may associate a "generation ID" to IP addresses and associate this generation ID with addresses in ADD_ADDRESS and PATHS messages. Generations may be associated with a side (e.g., client or server). For example, even-numbered generation IDs may be associated with the client and odd-numbered generation IDs with the server. By default, all client addresses may be associated with generation 0 ("gen0"), and all server addresses may be associated with generation 1 ("gen1"). Gen0 and gen1 may be by default the currently active generations. Therefore, it may be possible to use all existing messages and behavior by default, which may enable backward compatibility of the generation mechanism. New addresses, for example, associated with a different server, may then be advertised in association with next available generation 3 ("gen3"). The client may establish paths towards gen3 addresses but may not exchange any data on them as long as the active server-side generation is still gen1. A given path may be associated with a path generation ID, which is formed by a client generation ID (e.g., generation ID of the client address associated with this path) and a server generation ID (e.g., of the server-side IP address).

For example, by default a path may have a gen0-gen1 path generation ID, and in the case of a server migration, the new paths may have the path generation ID gen0-gen3. A new GENERATION frame may be sent by the current server to the client, to indicate the path generation ID which is now active. Upon reception of the GENERATION frame, the client switches all communication (e.g., from gen0-gen1 paths to gen0-gen3 paths). In some cases, this change may only be for new application connections, while it could alternatively be immediate for all traffic: the transition mode field of the GENERATION frame determines which behavior should be applied. Prior to switching generations, the old server may issue new STATE frames on existing gen0-gen1 paths, to request all traffic to be paused, or inactive, which may enable VM transfer between old and new server, for example. The new server may be made aware that its IP addresses will be associated with a non-default generation (e.g., using a programmatic API). For example, an application may listen to incoming connections on two ports: a first port for normal connections from new clients, and a second port for connections from clients that are migrated from another server. The socket listening to the second port may be created using a new socket option that contains the default generation ID used by this socket. Server IP addresses used for connections using the second port may by default be associated with gen3. There may be a need for an equivalent mechanism defined in a transport protocol such as QUIC, and frame types such as GENERATION or STATE may need to be defined.

While server migration (e.g., from gen1 to gen3) may be used as a typical example in the procedure described herein, client migration (e.g., from gen0 to gen2) may be supported using the same mechanism, where the roles of client and server are swapped.

A new GENERATION frame type may have the following fields: Server Generation ID (e.g., a variable-length integer), which may be the generation ID to use with the new active server (e.g., odd-numbered); Client Generation ID (e.g., a variable-length integer), which may be the generation ID to use with the new active client (e.g., even-numbered); Transition mode (e.g., a variable-length integer), which may be a code indicating the type of transition, including "only new application transactions" or "all active connections"; and/or, Reset flag (e.g., a bit), which if set, this flag may reset all paths and associated addresses to the active generation IDs, and also may be used after a completed migration (e.g., to reset all server-side IP addresses generation IDs from 3 to 1, and all gen0-gen3 paths to gen0-gen1 paths).

A new STATE frame type may have the following fields: a Server Connection State (e.g., a variable-length integer), which may be a code (ACTIVE or INACTIVE) indicating the desired connection state for the server-side. It may be changed only by the server, and/or it may be omitted in STATE frames sent by a client The STATE frame type may further include a Client Connection State (e.g., a variable-length integer), which may be a code (ACTIVE or INACTIVE) indicating the desired connection state for the client-side, and it may be changed only by the client and be omitted in STATE frames sent by a server (e.g., both peers may maintain in their internal state the client and server connection state for a given path, and to be usable for data traffic, both client and server connection states may be ACTIVE).

The normal ADD_ADDRESS frame type may be enhanced with the following fields: G bit, which if set, may indicate that the Generation ID field is present; and/or, Generation ID (e.g., a variable-length integer), which may be the generation ID associated with the address.

Furthermore, PATHS frame type may also be enhanced with generation ID-related information. In some cases, PATHS frames may include path description for all sending and receive paths (e.g., from the standpoint of the PATHS frame sender). Each path descriptor may include the path ID, the local and remote address IDs. In addition, PATHS frame type may be enhanced with the following field, for each path descriptor: a Local Generation ID (e.g., a variable-length integer), which may be the generation ID associated with the local IP address (e.g., from the standpoint of the PATHS frame sender); and/or, Remote Generation ID (e.g., a variable-length integer), which may be the generation ID associated with the remote IP address (from the standpoint of the PATHS frame sender).

Generation IDs may alternatively be encoded within the address IDs (e.g., which may be a field already present in MP-QUIC frames such as ADD_ADDRESS and maybe used to identify the address for address removal). For example, since only generations 0, 1, 2 and 3 are needed, and since the side (client, server) of an address is known, a single bit in the address IDs may be sufficient: even client-side address ID may be gen0, odd client-side address ID may be gen2, even server-side address ID may be gen1, odd server-side address ID may be gen3. However, for illustration purposes herein, generation IDs may be used.

Figure 13A:
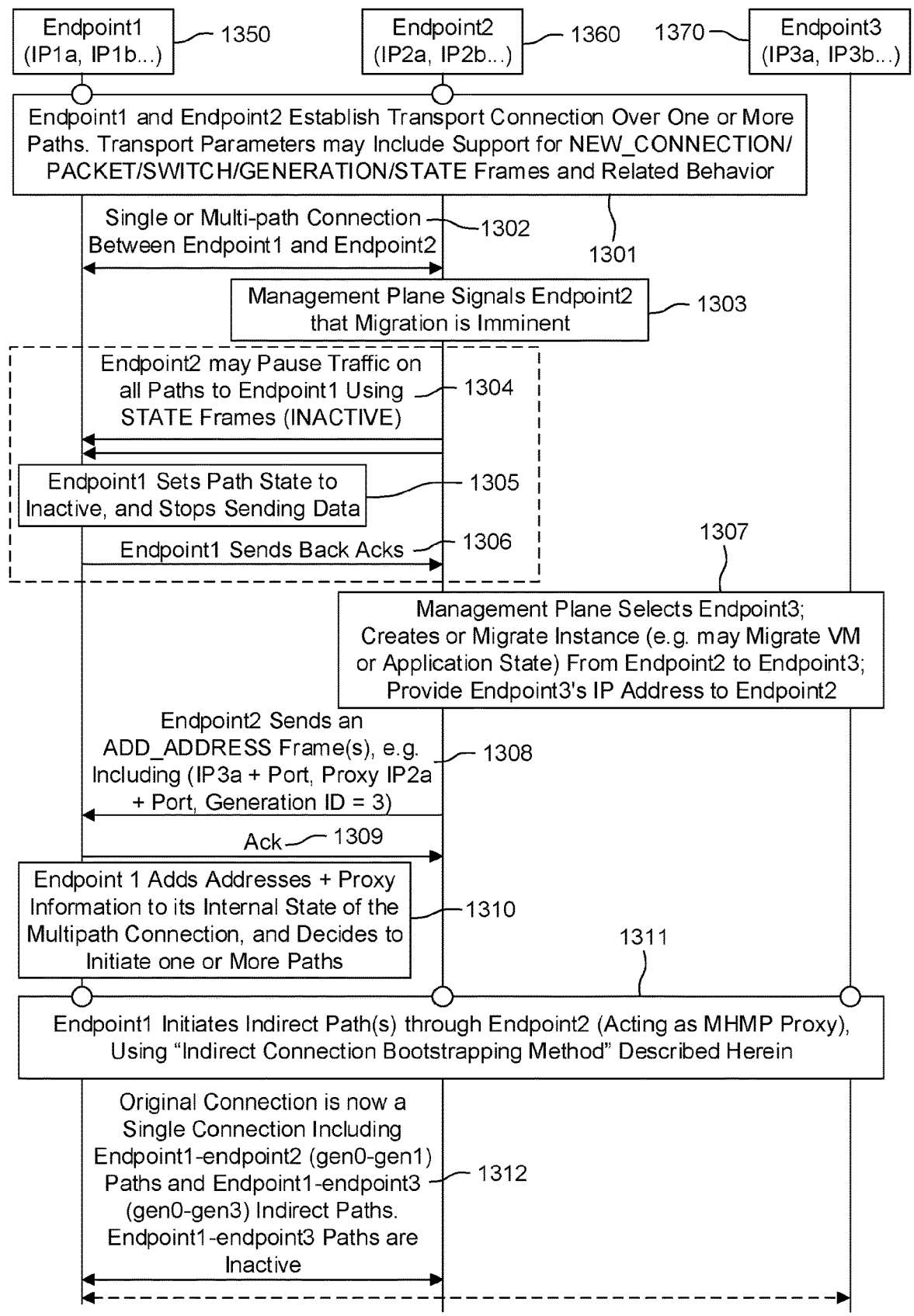
FIG. 13A is a diagram illustrating a first portion of an example of server migration procedure.
Figure 13B:
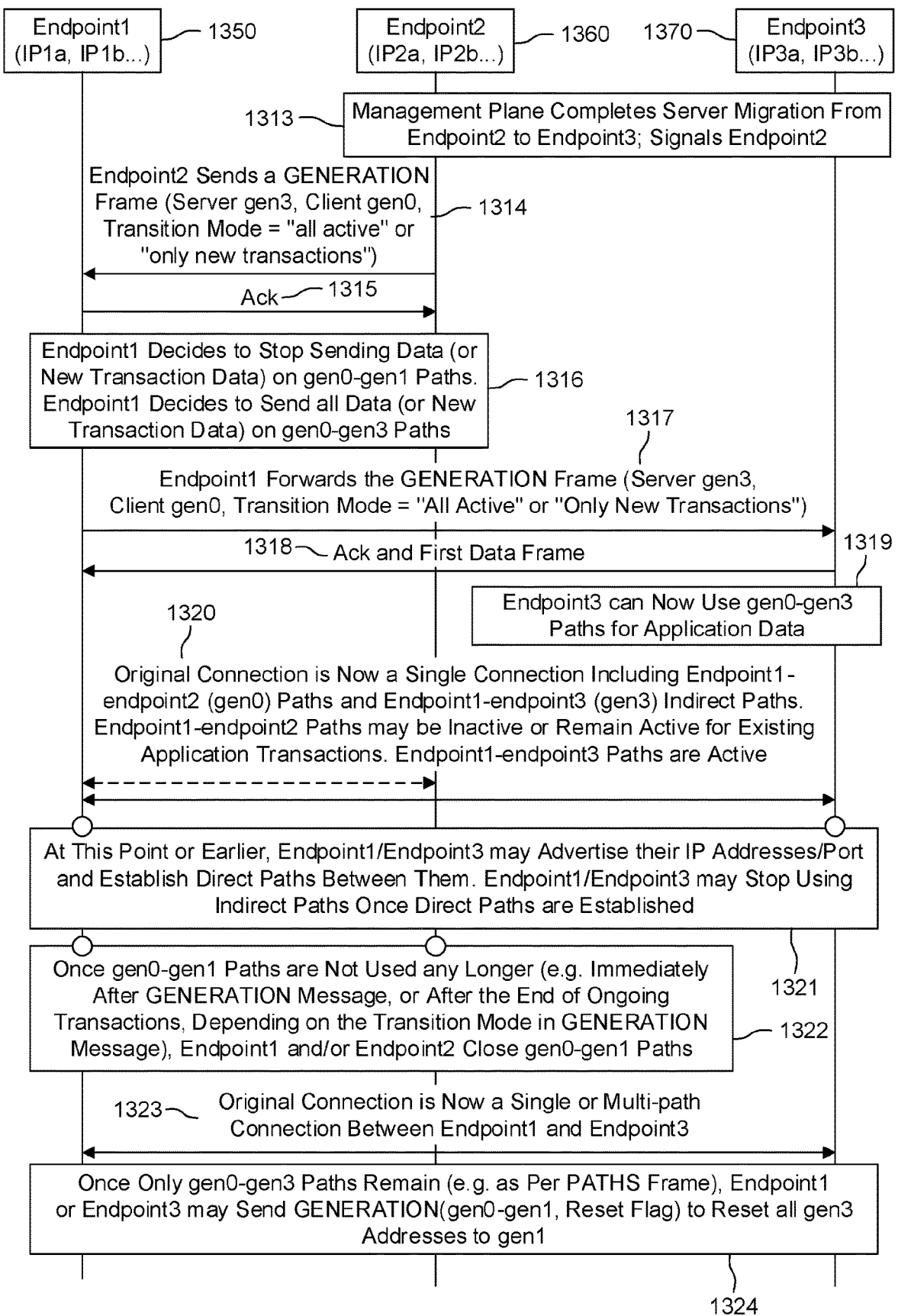
FIG. 13B is a diagram illustrating a second portion of an example of server migration procedure.

FIGS. 13A and 13B are diagrams illustrating an example of a server migration procedure using one or more techniques described herein. Both FIGS. 13A and 13B may be considered part of a single procedure, supporting the migration from a first server to a second server while maintaining the transport connection. As discussed substantially in paragraphs above, this procedure may be adapted to handle client migration similarly.

The generation ID may identify the instance running on an endpoint: same generation IDs may refer to the same instance, while different generation ID may refer to different instances. Different instances may not share an application or connection state. Therefore, a core aspect of this procedure is to synchronize switching from communicating with one instance (e.g., generation ID 1, first server) to communicating with another instance (e.g., generation ID 3, second server).

Regarding the steps shown in FIGS. 13A and 13B, at 13011, initially, Endpoint1 (e.g., a client), denoted by element 1350, may establish a transport connection to Endpoint2 (e.g., server), denoted by element 1360, using an MPMH-capable multipath protocol (e.g., MP-QUIC enhanced as previously described herein). A transport parameter may be added to existing transport parameters sent by one or both endpoints to indicate support for GENERATION-based server migration and may be used in addition to other transport parameters described herein. The transport parameter ID may be generation-based migration support (e.g., 0x0011), and the transport parameter length may be some value, such as 0 bit (e.g., empty parameter). This transport parameter may indicate that the sender supports the new frame types GENERATION and STATE, enhanced (e.g., for generation ID awareness) frame types ADD_ADDRESS and PATHS, and related migration support procedure described herein.

At 1302, a transport connection may exist between Endpoint1 and Endpoint2, over one or more direct or indirect paths.

At 1303, a server instance migration may be initiated, such as by the management plane of a service operator. The management plane (not shown in FIG. 13A) may signal to Endpoint2 that a migration is imminent.

Regarding 1304-1306, these steps may occur, for example, in cases where the server instance migration requires pausing traffic, such as in a hot VM migration case. Endpoint2 may send a STATE(INACTIVE) frame on paths to endpoint1. Endpoint1 may stop sending data on a path, for instance, upon reception of a STATE(INACTIVE) frame. Endpoint2 may stop sending data on a path, for instance, prior to sending the STATE(INACTIVE) frame.

At 1307, the management plane may select a target server Endpoint3, denoted by element 1370, and orchestrate server migration, which may include: creating a software instance on endpoint3, and/or migrating a VM or application state between Endpoint2 and Endpoint3. At this point, the migrated instance on Endpoint3 may listen for incoming connections but may not be ready to exchange application traffic yet. The management plane may provide Endpoint2 with Endpoint3's IP address.

Regarding 1308-1309, Endpoint2 may send ADD_ADDRESS frame(s) to the client, each including an IP address of endpoint3, and in some cases other existing fields (e.g., address ID, port, protocol version, etc.) and a generation ID value that is the next unused generation ID for this side (e.g., "3" for server migration). Proxy information elements designating Endpoint2 as the proxy may be present (e.g., including Endpoint2's IP address, version, port, with I bit set and typically A bit not set). However, Endpoint2 may send ADD_ADDRESS frames for direct (e.g., without proxy), indirect (e.g., with proxy, e.g., endpoint2), or a mix of direct and indirect connections. As an example shown in FIG. 13A, ADD_ADDRESS may be sent with proxy information, using Endpoint2 itself as the proxy. This may be useful to enable establishing communication with endpoint3 even before direct communication is possible (e.g., in anticipation of a mobility event). Endpoint1 may send back an acknowledgment.

At 1310, Endpoint1, upon reception, may store the added address information (e.g., including proxy information elements if present) in the internal state of the connection. Endpoint1's path manager may then decide to establish new path connections to those addresses.

At 1311, Endpoint1 may establish a new path or paths, or a connection to Endpoint3. In this example, these may be indirect paths, established using the method described herein (e.g., using NEW_CONNECTION, PACKET, and possibly SWITCH frames). Since these may be known to be gen0-gen3 paths by both Endpoint1 and Endpoint3, these paths may not be used to carry any data traffic.

At 1312, Endpoint1 may have gen0-gen1 path connections to Endpoint2 (e.g., which may be used for data traffic, unless they were set as inactive in steps 1304-1306) and gen0-gen3 path connections to Endpoint3, which may not currently be used for data traffic.

At 1313, at some point, a (e.g., management plane) entity signals Endpoint2 when the server migration is completed. Endpoint3 is now ready to exchange application traffic.

Regarding 1314-1315, Endpoint2 may send a GENERATION frame on one or more paths towards Endpoint1, including a server generation ID value of "3". A transition mode may be "all active connections" or "only new application transactions". Endpoint1 sends back an acknowledgment.

Regarding 1316-1319, Endpoint1 may implement a transition from using gen0-gen1 paths to using gen0-gen3 paths. Endpoint1 may use existing gen0-gen3 paths and/or initiate new gen0-gen3 paths. The transition from gen0-gen1 to gen0-gen3 may be performed in different ways, depending on the requested transition mode, the current state (e.g., active or inactive) of gen0-gen1 paths, and the behavior of the application server.

In a first example, in the case of a VM or container migration, all gen0-gen1 path connections may be inactive at this point (e.g., since steps 1304-1306). The transition mode may be set to "all active connections". Upon reception, the client (e.g., endpoint1) may forward the GENERATION (e.g., gen0-gen3) frame on one or more gen0-gen3 paths, which may inform Endpoint3 that gen0-gen3 paths can now be used for data traffic. Endpoint1 may send all application traffic over gen0-gen3 paths. In this case, the migration may be entirely transparent for both the client and server application.

In another example, gen0-gen1 paths may be currently active (e.g., steps 1304-1306 were not used). The transition mode may be set to "only new application transactions". This may be used, for example, when Endpoint3 hosts a stateless application instance, which communicates with a backend database server in a data center. Upon reception of the GENERATION(gen0-gen3) frame from Endpoint2, the client may forward it on one or more gen0-gen3 paths. This may inform Endpoint3 that gen0-gen3 paths can now be used for application traffic. Endpoint1 may keep using gen0-gen1 paths for existing application transactions, and send traffic for all new transactions (e.g., all HTTP GET/POST messages) onto gen0-gen3 paths. In this case too, the application client and server may not be aware of the migration, although the application server may be designed to handle each request independently (e.g., as a stateless application).

In another example, the transition mode may also be set to "only new application transactions". Upon receiving a signal that server migration is completed, the application instance running on endpoint2 may fail all outstanding application transactions. Upon reception of the GENERATION(gen0-gen3) frame from Endpoint2, the client may forward it on one or more gen0-gen3 paths. This may inform Endpoint3 that gen0-gen3 paths may now be used for application traffic. The client application on Endpoint1 may retry the application requests, which may therefore sent on gen0-gen3 paths towards Endpoint3, since these retries may be new application transactions. In this case, the server migration may be made visible to the client application as a set of transaction failures, but this may not require a major redesign of the application and may even be handled through normal application failure handling behavior. The server application may need some support for this case, such as it must fail all ongoing transactions for a given client upon request (e.g., from a management plane component).

At 1320, Endpoint1 may have gen0-gen1 paths to Endpoint2, which may be in use for ongoing transactions, or may be unused. Endpoint1 may also have gen0-gen3 paths to Endpoint3, which may be used for application traffic.

At 1321, assuming the existing gen0-gen3 are indirect paths through endpoint2/proxy, as shown, Endpoint3 may advertise its IP addresses using ADD_ADDRESS over one or more gen0-gen3 paths to Endpoint1. Endpoint1 may establish direct path connections to endpoint3 using this information. Endpoint1 and Endpoint3 may stop using indirect paths once the direct paths are established. As a result, Endpoint2 may not have any indirect path traffic to forward, and may remove the forwarding entry (e.g., after a timeout period).

At 1322, once gen0-gen1 paths between Endpoint1 and Endpoint2 are not in use (e.g., after the end of the ongoing application transactions, or immediately after the GENERATION message reception), Endpoint1 or Endpoint2 may close gen0-gen1 paths.

At 1323, the original Endpoint1-Endpoint2 connection is now migrated into a single- or multi-path connection between endpoint1 and endpoint3.

At 1324, in order to be able to perform another migration following the same procedure towards another server later, Endpoint1 or Endpoint3 may reset all gen3 addresses to gen1 addresses (e.g., gen0-gen3 paths therefore become gen0-gen1 paths). This may be performed once the only existing paths are known to be gen0-gen3 from both endpoints' standpoint. For example, Endpoint3, which may only terminate gen0-gen3 paths, may receive an enhanced PATHS frame, as defined herein, from Endpoint1, which only includes gen0-gen3 paths. Endpoint3 may then send a GENERATION (e.g., gen0-gen1, with reset flag set) to Endpoint1. Both Endpoint1 and Endpoint3 may then set in their internal state all gen3 addresses to gen1.

For seamless proxying with no traffic overhead or multiplexing, and application-specific action on a proxy, an endpoint may send a NEW_CONNECTION frame to a proxy, to initiate QUIC-over-QUIC proxying based on PACKET frames. The endpoint may send a SWITCH frame to replace the encapsulated proxy connection with the inner QUIC connection, which may replace encapsulation with no-overhead forwarding. SESSION_KEY frame can be used to enable point-to-multipoint and multicast. For advertisement of a proxied connection in MP_QUIC, an endpoint may send an ADD_ADDRESS frame type enhanced with proxy-related information elements. A receiving endpoint may use this information to initiate a path using QUIC-over-QUIC. Where a server-side and client-side IP addresses are associated with a generation ID, the server may tell the client to switch from old to new generation path as part of a migration procedure using new frame types GENERATION and STATE, and on enhanced frame types ADD_ADDRESS and PATHS.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read-only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A client endpoint comprising:
 a processor; and a transceiver:
 the processor and the transceiver configured to send, to a network node, a request to establish a Quick User Datagram Protocol (UDP) Connection (QUIC) connection with a destination endpoint, the request to establish the QUIC connection including a flow identifier (ID);
 the transceiver configured to receive, from the network node, a response including an indication that the request to establish the QUIC connection with the destination endpoint is accepted;
 the processor and the transceiver configured to send, to the network node, outer QUIC packetized data encapsulating inner QUIC packetized data to be forwarded to the destination endpoint, wherein the inner QUIC packetized data includes information indicating the flow ID;
 the processor and the transceiver configured to send, to the network node, a request to cease encapsulation of inner QUIC packetized data within outer QUIC packetized data;
 the transceiver configured to receive, from the network node, a response to the request to cease encapsulation of inner QUIC packetized data within outer QUIC packetized data, wherein the response includes information indicating the request to cease encapsulation of inner QUIC packetized data within outer QUIC packetized data is accepted; and
 the processor and the transceiver configured to send, to the network node, a UDP datagram including inner QUIC packetized data to be forwarded to the destination endpoint.

2. The client endpoint of claim 1, wherein the processor and the transceiver are configured to send, to the network node, a request to establish another QUIC connection with another destination endpoint, the request to establish the another QUIC connection including another flow ID.

3. The client endpoint of claim 1, wherein the request to establish the QUIC connection with the destination endpoint is encapsulated in the outer QUIC packetized data.

4. The client endpoint of claim 1, wherein the inner QUIC packetized data and the outer QUIC packetized data are separately encrypted.

5. The client endpoint of claim 1, wherein the request to cease encapsulation of inner QUIC packetized data within outer QUIC packetized data is sent in response to a connection to the destination endpoint reaching a predefined level of encryption.

6. The client endpoint of claim 1, wherein the request to cease encapsulation of inner QUIC packetized data is accepted on a condition the QUIC connection with the destination endpoint does not carry multiple multiplexed QUIC flows.

7. The client endpoint of claim 1, wherein the network node is a proxy configured to forward the inner QUIC packetized data to the destination endpoint.

8. A method performed by a client endpoint comprising:
 sending, to a network node, a request to establish a Quick User Datagram Protocol (UDP) Connection (QUIC) connection with a destination endpoint, the request to establish the QUIC connection including a flow identifier (ID);
 receiving, from the network node, a response including an indication that the request to establish the QUIC connection with the destination endpoint is accepted;
 sending, to the network node, outer QUIC packetized data encapsulating inner QUIC packetized data to be forwarded to the destination endpoint, wherein the inner QUIC packetized data includes information indicating the flow ID;
 sending, to the network node, a request to cease encapsulation of inner QUIC packetized data within outer QUIC packetized data;
 receiving, from the network node, a response to the request to cease encapsulation of inner QUIC packetized data within outer QUIC packetized data, wherein the response includes information indicating the request to cease encapsulation of inner QUIC packetized data within outer QUIC packetized data is accepted; and
 sending, to the network node, a UDP datagram including inner QUIC packetized data to be forwarded to the destination endpoint.

9. The method of claim 8 comprising sending, to the network node, a request to establish another QUIC connection with another destination endpoint, the request to establish the another QUIC connection including another flow ID.

10. The method of claim 8, wherein the request to establish the QUIC connection with the destination endpoint is encapsulated in the outer QUIC packetized data.

11. The method of claim 8, wherein the inner QUIC packetized data and the outer QUIC packetized data are separately encrypted.

12. The method of claim 8, wherein the request to cease encapsulation of inner QUIC packetized data within outer QUIC packetized data is sent in response to a connection to the destination endpoint reaching a predefined level of encryption.

13. The method of claim 8, wherein the request to cease encapsulation of inner QUIC packetized data is accepted on a condition the QUIC connection with the destination endpoint does not carry multiple multiplexed QUIC flows.

14. The method of claim 8, wherein the network node is a proxy configured to forward the inner QUIC packetized data to the destination endpoint.

15. A network node comprising:
- a processor; and
- a transceiver;
- the transceiver configured to receive, from a client endpoint, a request to establish a Quick User Datagram Protocol (UDP) Connection (QUIC) connection with a destination endpoint, the request to establish the QUIC connection including a flow identifier (ID);
- the processor and the transceiver configured to send, to the client endpoint, a response including an indication that the request to establish the QUIC connection with the destination endpoint is accepted;
- the transceiver configured to receive, from the client endpoint, outer QUIC packetized data encapsulating inner QUIC packetized data, the inner QUIC packetized data including the flow ID;
- the processor and the transceiver configured to forward the inner QUIC packetized data toward the destination endpoint based on the flow ID;
- the transceiver configured to receive, from the client endpoint, a request to cease encapsulation of inner QUIC packetized data within outer QUIC packetized data;
- the processor and the transceiver configured to send, to the client endpoint, a response to the request to cease encapsulation of inner QUIC packetized data within outer QUIC packetized data, wherein the response includes information indicating the request to cease encapsulation of inner QUIC packetized data within outer QUIC packetized data is accepted; and
- the processor and the transceiver configured to forward a UDP datagram to the destination endpoint including inner QUIC packetized data from the client endpoint.

16. The network node of claim 15, wherein the processor and the transceiver are configured to receive, from the client endpoint, a request to establish another QUIC connection with another destination endpoint, the request to establish the another QUIC connection including another flow ID.

17. The network node of claim 15, wherein the request to establish the QUIC connection with the destination endpoint is encapsulated in the outer QUIC packetized data.

18. The network node of claim 15, wherein the inner QUIC packetized data and the outer QUIC packetized data are separately encrypted.

19. The network node of claim 15, wherein the request to cease encapsulation of inner QUIC packetized data within outer QUIC packetized data is received on a condition a connection to the destination endpoint reaches a predefined level of encryption.

20. The network node of claim 15, wherein the request to cease encapsulation of inner QUIC packetized data is accepted on a condition the QUIC connection with the destination endpoint does not carry multiple multiplexed QUIC flows.

* * * * *